US010902379B2

(12) United States Patent
Ryals et al.

(10) Patent No.: US 10,902,379 B2
(45) Date of Patent: Jan. 26, 2021

(54) SYSTEM FOR CUSTOMIZED UNREQUESTED ITEM RESOLUTION

(71) Applicant: Walmart Apollo, LLC, Bentonville, AR (US)

(72) Inventors: Alex Ryals, Fayetteville, AR (US); Benji Enssle, Bella Vista, AR (US)

(73) Assignee: Walmart Apollo, LLC, Bentonville, AR (US)

(*) Notice: Subject to any disclaimer, the term of this patent is extended or adjusted under 35 U.S.C. 154(b) by 290 days.

(21) Appl. No.: 16/028,534

(22) Filed: Jul. 6, 2018

(65) Prior Publication Data

US 2019/0026686 A1 Jan. 24, 2019

Related U.S. Application Data

(60) Provisional application No. 62/536,137, filed on Jul. 24, 2017.

(51) Int. Cl.
G06N 5/02 (2006.01)
G06Q 10/08 (2012.01)

(52) U.S. Cl.
CPC .......... *G06Q 10/087* (2013.01); *G06N 5/025* (2013.01)

(58) Field of Classification Search
None
See application file for complete search history.

(56) References Cited

U.S. PATENT DOCUMENTS

| | | | |
|---|---|---|---|
| 7,003,474 B2 | 2/2006 | Lidow | |
| 7,385,529 B2 | 6/2008 | Hersh et al. | |
| 7,762,459 B2 | 7/2010 | Haller | |
| 8,217,756 B2 | 7/2012 | Kumar et al. | |
| 8,275,677 B2 | 9/2012 | Armstrong et al. | |
| 9,589,247 B2 | 3/2017 | Bolene et al. | |
| 2002/0019761 A1* | 2/2002 | Lidow | G06Q 10/02 705/5 |
| 2003/0074206 A1* | 4/2003 | Hoffman | G06Q 50/188 705/80 |
| 2008/0313059 A1* | 12/2008 | Martinek | G06Q 10/08 705/28 |
| 2009/0276669 A1 | 11/2009 | Hoopes et al. | |
| 2014/0074668 A1 | 3/2014 | Gomez | |
| 2015/0046363 A1 | 2/2015 | McNamara et al. | |

* cited by examiner

*Primary Examiner* — Allen C Chein
*Assistant Examiner* — Denisse Y Ortiz Roman

(57) ABSTRACT

Examples provide an unrequested item resolution system. A rules-decision engine analyzes unrequested item data using a set of per-item constraints to determine whether to accept or reject at least one unrequested item based on open order(s) and/or predicted future order(s). The rules-decision engine generates a reject notification if an overage amount of the at least one unrequested item exceeds an overage amount threshold or a quantity of the at least one unrequested item is above a quantity threshold. A prediction engine generates an accept notification if the unrequested item(s) conform to one or more predicted items. A resolution component extracts supplier-specific resolution data from a plurality of unresolved remedy tickets for the identified supplier. A notification component generates a consolidated notification for the identified supplier, including the extracted supplier-specific resolution data. The notification engine sends the consolidated notification to a client device associated with the identified supplier.

20 Claims, 12 Drawing Sheets

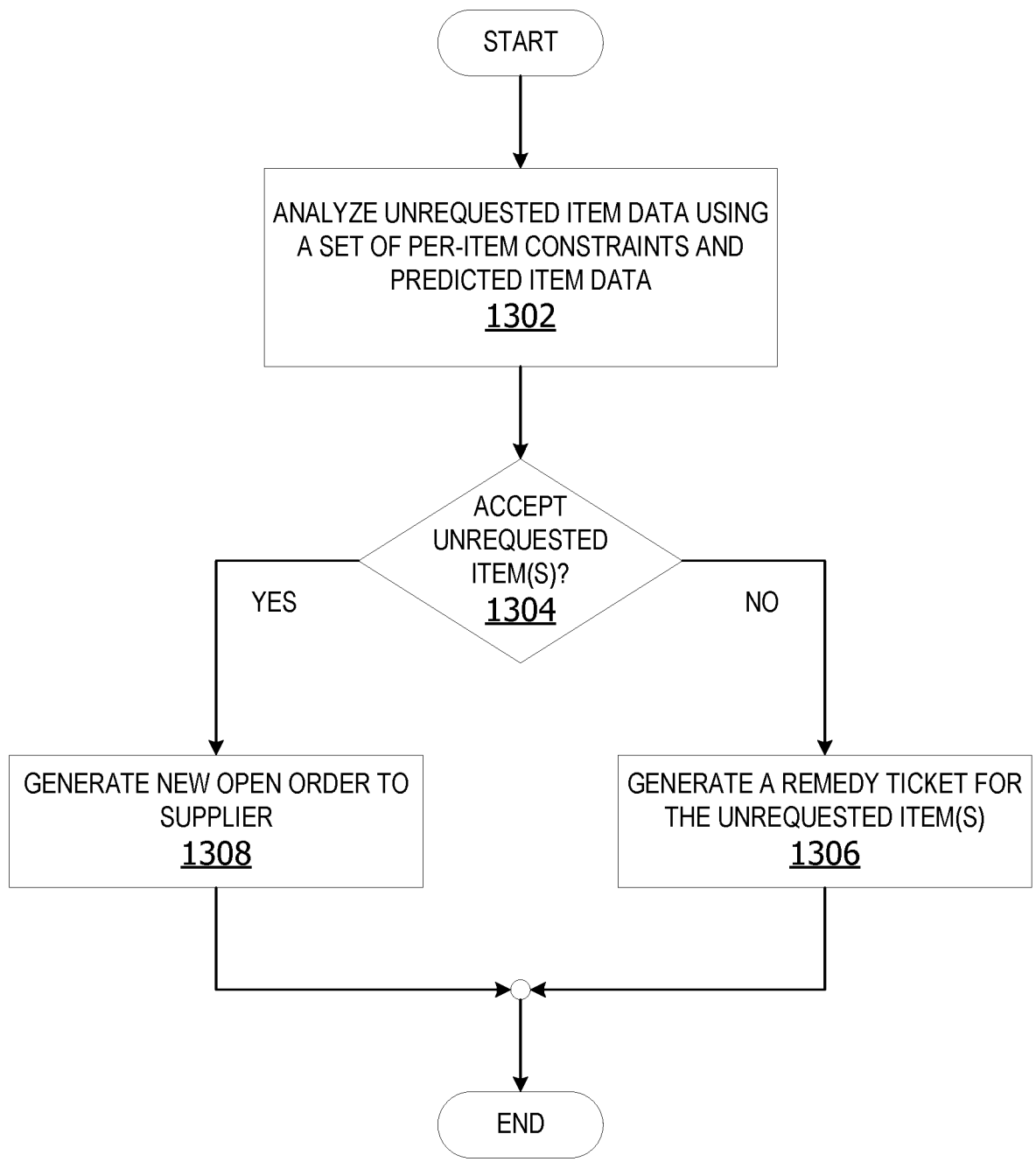

US 10,902,379 B2

SYSTEM FOR CUSTOMIZED UNREQUESTED ITEM RESOLUTION

BACKGROUND

Distribution centers frequently receive many different types of items from many different suppliers for storage and/or redistribution to stores, warehouses, other distribution centers, or directly to purchasers. A large distribution center may receive thousands of different items from dozens of different suppliers. If a supplier sends an incorrect item to the distribution center, a manager typically sends an individual email notification for each incorrect item to the supplier. Moreover, even if multiple incorrect items are received from the same supplier, a separate email is created for each incorrect item. An incorrect item may be a wrong type of item or a wrong quantity of a correct type of item. At a large distribution center, thousands of these emails may be generated each year consuming the time and resources of multiple managers as well as expense incurred generating and managing the voluminous number of incorrect item email notifications. This is an unduly burdensome, inefficient, and time-consuming process.

SUMMARY

Examples of the disclosure provide a system for per-supplier customized remedy resolution. The system includes a memory, at least one processor communicatively coupled to the memory and a set of scan devices generating scan data associated with a plurality of items received at a receiving center. A verification component analyzes the scan data using item identification data associated with a set of open orders to identify a set of unrequested items. An unrequested item is an item failing to conform to at least one requested item in at least one open order in the set of open orders. The verification component compares unrequested item data describing the set of unrequested items with requested item data associated with the set of open orders. The set of open orders includes items requested from the selected supplier in a set of replenishment orders, a set of manual orders and a set of online orders. The verification component generates an accept notification on determining the set of unrequested items conforms to the at least one open order in the set of open orders. A prediction engine generates a set of predicted future orders associated with the selected supplier based on transaction history data, seasonal data and pattern analysis. The set of predicted future orders includes predicted replenishment orders and predicted manual orders associated with a plurality of retail locations. The prediction engine generates an accept notification on determining the set of unrequested items conforms to at least one predicted item in the set of predicted future orders. A rules-decision engine analyzes the unrequested item data using a set of per-item constraints on condition an accept notification associated with the set of unrequested items is unreceived. The rules-decision engine generates an accept notification on condition the set of per-item constraints indicates acceptance of the set of unrequested items. The rules-decision engine generates a reject notification on condition the set of per-item constraints indicates rejection of the set of unrequested items. A drone delivery device transports the set of unrequested items to a delivery location on condition an accept notification associated with the set of unrequested items is received. A notification component outputs a consolidated unrequested items notification for the selected supplier to a client device associated with the supplier via a network on condition a reject notification is received. The consolidated notification includes aggregated supplier-specific resolution data extracted from a set of unresolved remedy tickets for the selected supplier.

Other examples provide a computer-implemented method for per-supplier customized remedy resolution. A verification component compares unrequested item data associated with a set of unrequested items with requested items data associated with a set of open orders and a set of predicted future orders. The set of open orders comprising items requested from the selected supplier in a set of replenishment orders, a set of manual orders and a set of online orders. The set of predicted future orders includes predicted replenishment orders and predicted manual orders associated with a plurality of retail locations. An accept notification associated with the set of unrequested items is generated if the unrequested item conforms to at least one requested item in the set of open orders or the set of predicted future orders. A rules decision engine analyzes requested items data associated with a set of open orders associated with an identified supplier using a set of per-item constraints to determine whether to accept or reject at least one unrequested item on condition the set of unrequested items fails to conform to a requested item in the set of unrequested items. The rules-decision engine generates a reject notification if an overage amount of the at least one unrequested item exceeds an overage amount threshold in the set of per-item constraints or a quantity of the at least one unrequested item is above a quantity threshold associated with the set of per-item constraints. If a reject notification is received from the rules decision engine, a remedy ticket generator creates a remedy ticket for the at least one unrequested item. The remedy ticket generator stores the remedy ticket with a plurality of unresolved remedy tickets in a data store. Supplier-specific resolution data is extracted from a set of unresolved remedy tickets for the identified supplier. The set of unresolved remedy tickets includes the remedy ticket for the at least one unrequested item. A notification component generates a consolidated notification for the identified supplier using the extracted, supplier-specific resolution data. The consolidated notification includes the supplier-specific resolution data associated with each unresolved remedy ticket in the set of unresolved remedy tickets. A notification engine sends the consolidated notification to a client device associated with the identified supplier.

Other examples provide a system for per-supplier customized unrequested item resolution. The system includes a memory and at least one processor communicatively coupled to the memory. A rules-decision engine analyzes unrequested item data associated with at least one unrequested item received from an identified supplier using a set of per-item constraints to determine whether to accept or reject the at least one unrequested item. A remedy ticket generator generates a remedy ticket associated with the at least one unrequested item if a reject notification is received from the rules-decision engine. The remedy ticket is stored with a plurality of unresolved remedy tickets associated with a plurality of suppliers in a data storage device. A resolution component extracts supplier-specific resolution data from each remedy ticket in a set of unresolved remedy tickets associated with the identified supplier retrieved from the plurality of unresolved remedy tickets on an occurrence of a predetermined event. A notification component generates a consolidated notification including the supplier-specific resolution data from the set of unresolved remedy tickets associated with the identified supplier and a request for resolution instructions regarding disposition of a plurality of unrequested items received from the identified supplier. A communication interface component sends the consolidated notification to a client device associated with the identified supplier via a network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 13 is an exemplary flow chart illustrating operation of the computing device to accept or reject unrequested items.

Corresponding reference characters indicate corresponding parts throughout the drawings.

DETAILED DESCRIPTION

Figure 1:
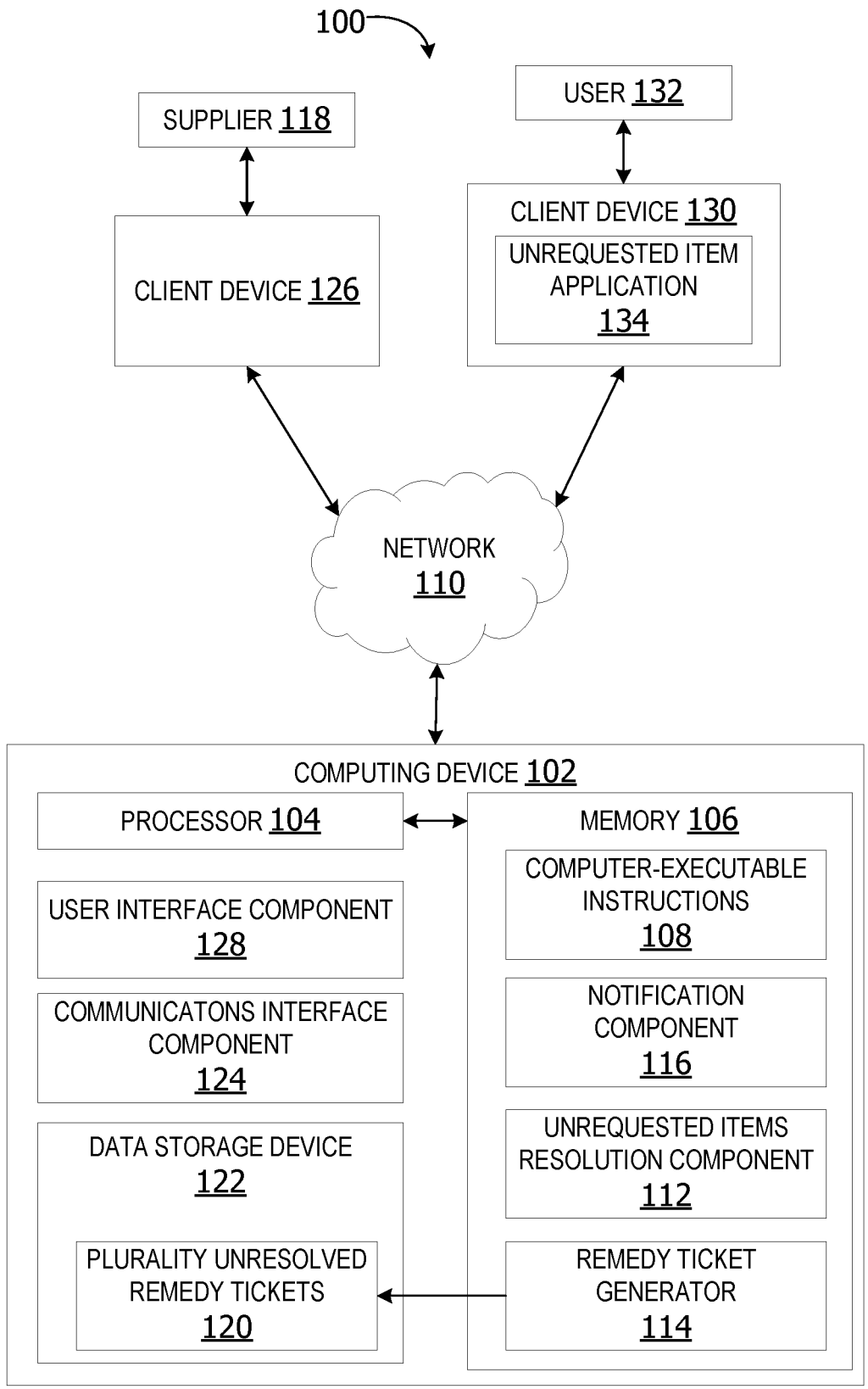
FIG. 1 is an exemplary block diagram illustrating a system for per-supplier unrequested item resolution.

Referring to the figures, examples of the disclosure enable per-supplier unrequested item resolution. In some examples, a prediction engine identifies a set of predicted items which have not been ordered from a supplier and predicted to be requested/ordered within a given time-period in the future. If an unrequested item or item data describing the unrequested item conforms to an item in the set of predicted items, the prediction engine accepts the unrequested item. The prediction engine generates a reject notification if the unrequested item is excluded from the set of predicted items. This enables the system to determine whether to accept items based on predicted future need for the unrequested item. This enables more efficient disposition of unrequested items, avoids waste, and minimizes unnecessary returns of items back to the supplier and/or donations of items.

A rules-decision engine in other examples analyzes the unrequested item data using a set of per-item constraints for determining whether to accept or reject the set of unrequested items. The rules-decision engine generates an accept notification if the unrequested item conforms to the set of per-item constraints. The constraint rules may provide thresholds and/or constraints for determining whether to accept or reject an unrequested item based on the type of item, quantity of the item, and/or overage amount for the unrequested item. The per-item constraints in some examples enable more accurate determinations as to whether to accept un-ordered items or return the un-ordered items to the supplier. The constraints enable more reliable accept or reject determination while improving consistency in unrequested item resolution management.

In other examples, a notification component generates a consolidated notification for the supplier, including resolution data for two or more remedy tickets. The consolidated notification is output to a client device associated with the supplier on occurrence of a predetermined event. This minimizes the amount of emails, correspondence, and other notifications generated by user, as well as minimizing the number of notifications sent to the same supplier. This increases user efficiency and accuracy of unrequested item notifications. The unrequested item resolution component further reduces the resources required to resolve unrequested items issues.

Referring again to FIG. 1, an exemplary block diagram illustrates a system for per-supplier unrequested item resolution. The system 100 includes a computing device 102. The computing device 102 represents any device executing instructions (e.g., as application programs, operating system functionality, or both) to implement the operations and functionality associated with the computing device 102.

The computing device 102 in this non-limiting example is a server. In other examples, the computing device 102 may include a mobile computing device or any other portable device. The computing device 102 may also include less portable devices such as desktop personal computers, kiosks, tabletop devices, industrial control devices, wireless charging stations, and electric automobile charging stations. Additionally, the computing device 102 may represent a group of processing units or other computing devices.

In some examples, the computing device 102 has at least one processor and a memory 106. The processor 104 includes any quantity of processing units and is programmed to execute computer-executable instructions 108 stored on the memory 106. The computer-executable instructions 108 may be performed by the processor 104 or by multiple processors within the computing device 102 or performed by a processor external to the computing device 102. In some examples, the processor 104 is programmed to execute instructions such as those illustrated in the figures (e.g., FIG. 7, FIG. 8, FIG. 9, and FIG. 10).

In some examples, the processor 104 represents an implementation of analog techniques to perform the operations described herein. For example, the operations may be performed by an analog computing device and/or a digital computing device.

The computing device 102 further has one or more computer readable media, such as the memory 106. The memory 106 includes any quantity of media associated with or accessible by the computing device 102. The memory 106 may be internal to the computing device 102 (as shown in FIG. 1), external to the computing device (not shown), or both (not shown). In some examples, the memory 106 includes read-only memory and/or memory wired into an analog computing device.

The memory 106 stores data, such as one or more applications. The applications, when executed by the processor, operate to perform functionality on the computing device 102. The applications may communicate with counterpart applications or services such as web services accessible via a network 110. For example, the applications may represent downloaded client-side applications that correspond to server-side services executing in a cloud.

The network 110 is implemented by one or more physical network components, such as, but without limitation, routers, switches, network interface cards (NICs), and other network devices. The network 110 may be any type of network for enabling communications with remote computing devices, such as, but not limited to, a local area network (LAN), a subnet, a wide area network (WAN), a wireless (Wi-Fi) network, or any other type of network. In this example, the network 110 is a WAN accessible to the public, such as the Internet.

The memory 106 stores one or more computer-executable components. Exemplary components include an unrequested item resolution component 112, a remedy ticket generator 114, and a notification component 116. The unrequested item resolution component 112, when executed by the processor 104 of the computing device 102, causes the processor 104 to analyze unrequested item data associated with at least one unrequested item received from a supplier 118 to determine whether to accept or reject the at least one unrequested item.

An unrequested item is an item shipped to a distribution center or other receiving center that is an un-ordered item. An unrequested item may be an incorrect type of item. For example, if running shoes are ordered but soccer shoes are delivered instead, the soccer shoes are unrequested items because they are a different type of shoe than the requested running shoes.

An unrequested item may also be an incorrect quantity of an item. For example, if fifty pairs of running shoes are ordered but sixty pairs of running shoes are received at the distribution center, the extra ten pairs of running shoes are unrequested items which do not conform to an open order with the supplier. An open order is an order for one or more items that have not been received. However, fifty pairs of the running shoes are correct, requested items which conform to the open order for the fifty pairs of running shoes.

The remedy ticket generator 114, when executed by the processor 104 of the computing device 102, causes the processor 104 to generate at least one remedy ticket including per-supplier resolution data for the at least one unrequested item. The remedy ticket generator 114 stores the at least one remedy ticket with a plurality of unresolved remedy tickets 120 associated with a plurality of suppliers in a data storage device 122.

The data storage device 122 is a set of one or more data storage devices for storing data. The data storage device 122 may include one or more types of data storage devices, such as, for example, one or more rotating disks drives, one or more solid state drives (SSDs), and/or any other type of data storage device.

In some examples, the unrequested item resolution component 112 extracts supplier-specific resolution data from each remedy ticket in a set of unresolved remedy tickets associated with the supplier 118 retrieved from the plurality of unresolved remedy tickets 120.

The notification, when executed by the processor 104 of the computing device 102, causes the processor 104 generate a consolidated notification using the extracted supplier-specific resolution data from each remedy ticket in the set of unresolved remedy tickets associated with the supplier 118.

A communications interface component 124 transmits the consolidated notification to a client device 126 associated with the supplier 118 via the network 110. The consolidated notification requests resolution instructions regarding disposition of a plurality of unrequested items received from the supplier 118, including the at least one unrequested item. In some examples, when the resolution instructions are received from the supplier 118, the computing device 102 transmits the resolution instructions to the client device 130 associated with the user 132. The user 132 then carries out the instructions for returning or donating the unrequested item(s).

The client device 126 may include a mobile computing device or any other portable device. In some examples, the client device 126 includes a mobile telephone, laptop, tablet, computing pad, netbook, gaming device, and/or portable media player.

In some examples, the communications interface component 124 includes a network interface card and/or computer-executable instructions (e.g., a driver) for operating the network interface card. Communication between the computing device 102 and other devices may occur using any protocol or mechanism over any wired or wireless connection. In some examples, the communications interface component 124 is operable with short range communication technologies such as by using near-field communication (NFC) tags.

In some examples, the user interface component 128 includes a graphics card for displaying data to the user and receiving data from the user. The user interface component 128 may also include computer-executable instructions (e.g., a driver) for operating the graphics card. Further, the user interface component 128 may include a display (e.g., a touch screen display or natural user interface) and/or computer-executable instructions (e.g., a driver) for operating the display. The user interface component 128 may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a specified manner.

In some examples, the system 100 includes a client device 130 associated with a user 132. The client device 130 may be implemented as any type of computing device, including, but not limited to, a server, a desktop computer, a laptop computer, a tablet computing device, or any other device for executing computer executable instructions. The client device 130 may include a processor and a memory storing data, such as one or more applications. The applications, when executed by the processor, operate to perform functionality on the client device 130.

Exemplary applications may include an unrequested item application 134 for generating unrequested item data, including item identification data, associated with one or more items received from the supplier 118. The unrequested item application 134 transmits the unrequested item data to the computing device 102 via the network 110.

Figure 2:
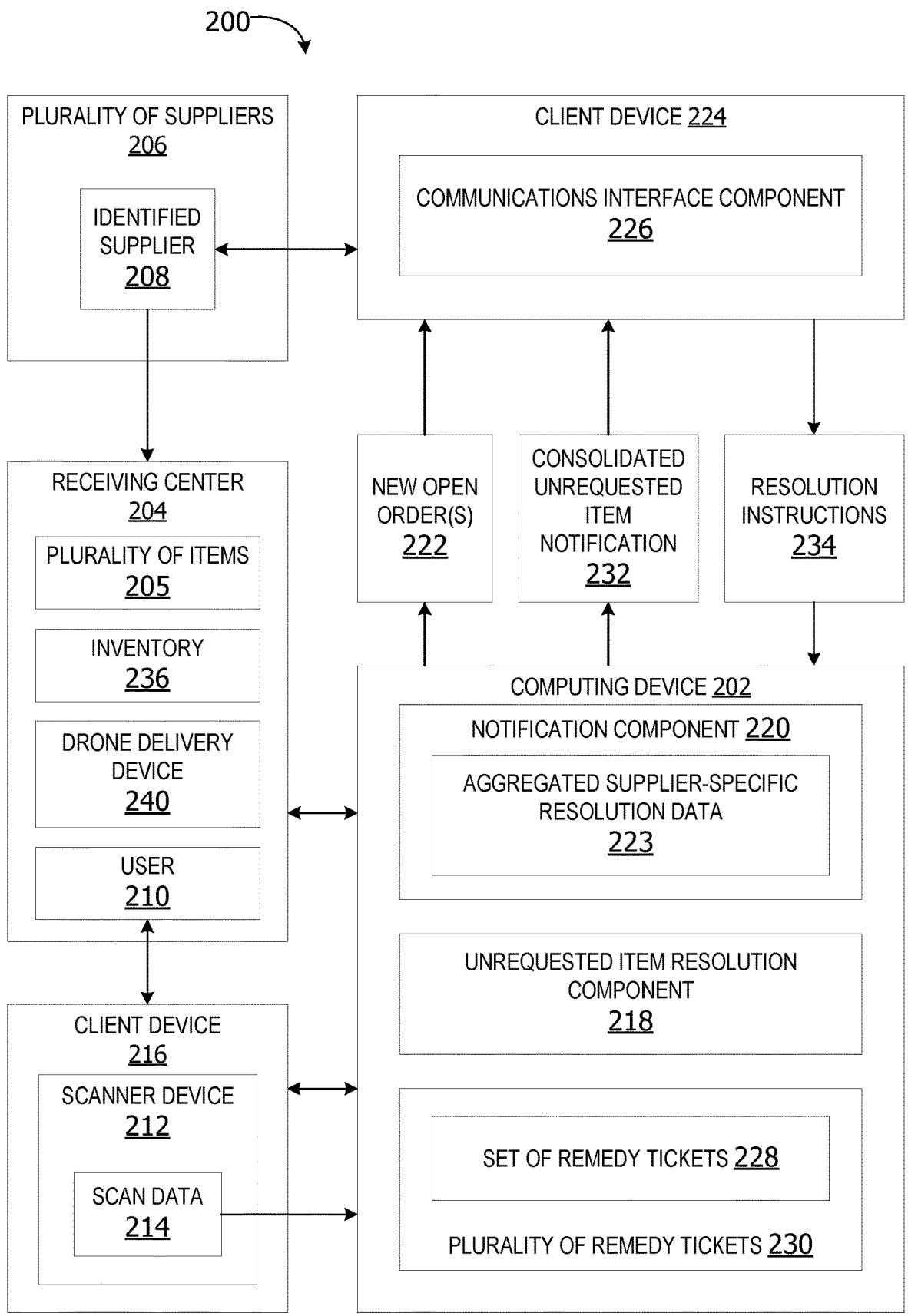
FIG. 2 is an exemplary block diagram illustrating a system for generating a consolidated notification for unrequested item resolution.

FIG. 2 is an exemplary block diagram illustrating a system for generating a consolidated notification for unrequested item resolution. The unrequested item resolution system 200 may include a computing device 202 for resolving issues associated with unrequested items received from one or more suppliers, such as the computing device 102 in FIG. 1.

The computing device 202 is associated with a receiving center 204. The receiving center 204 is a location receiving items from a plurality of items 205 from a plurality of suppliers 206, including an identified supplier 208. The receiving center 204 may include a distribution center, a warehouse, a retail store, a fulfillment center, a cross-dock facility, a bulk break center, or a package handling center.

The receiving center 204 in some examples includes an inventory 236 that supplies one or more individual stores. The inventory 236 includes the items the receiving center 204 needs to support one or more stores. The inventory may include assembly items that float through the receiving center 204 without being warehoused at the receiving center 204. Assembly items received at the receiving center 204 may be immediately distributed to one or more other stores. Warehoused items are stored at receiving center 204 until distribution is needed (item distinction may be based on type of item, size of item, projected sales amount per time frame, etc.) For example, water is warehoused because individual stores may only hold a minimum quantity. The receiving center 204 adjusts orders for water based on actual demands and predicted future demands of multiple different stores.

In some examples, the receiving center 204 receives a plurality of items from the plurality of suppliers 206, destined to be sent to multiple different stores. The plurality of items includes one or more unrequested items. A user 210 associated with the receiving center 204 scans the item(s) received from the identified supplier 208 using a scanner device 212. The user 210 may scan a barcode, radio frequency identification (RFID) tag, or other identifier code using the scanner device 212 to generate scan data 214. The scan data 214 includes identification data associated with the one or more unrequested items.

The client device 216 sends the scan data 214 to the computing device 202. The computing device 202 analyzes the scan data 214 to identify the one or more unrequested items. The unrequested item resolution component 218 determines whether to accept the unrequested items or reject the unrequested items. If the unrequested item resolution component 218 decides to accept the unrequested items, the notification component 220 generates one or more new open orders 222 including the accepted unrequested items.

An open order is an order for one or more items that have not been received at the receiving center. If the receiving center orders eighty cases on an open order and the receiving center receives one hundred cases from the supplier, the extra, unrequested twenty cases of overage do not have a designated home or assigned location/storage area. The unrequested item resolution component creates a new open order for those twenty cases of overage if the receiving center wants to accept the twenty cases. Alternatively, the unrequested item resolution component may reach out to the supplier to return or donate the twenty cases.

The one or more new open orders 222 are sent to a client device 224 associated with the identified supplier 208 via a communications interface component 226. The client device 224 may be any type of computing device associated with a supplier, such as the client device 130 in FIG. 1.

In other examples, instead of generating a new open order, the notification component 220 modifies an existing open order by adding the one or more accepted unrequested items to the existing open order. The updated open order is sent to the client device 224.

If the unrequested item resolution component 218 rejects the one or more unrequested items, a remedy ticket generator generates a remedy ticket for the rejected items. On an occurrence of a predetermined event, the unrequested item resolution component 218 identifies a set of one or more remedy tickets 228 associated with the identified supplier 208 retrieved from the plurality of remedy tickets 230.

The notification component 220 may generate a consolidated unrequested item notification 232 including aggregated supplier-specific (per-supplier) resolution data 223 extracted from each remedy ticket in the set of remedy tickets 228. The notification component 220 is sent to the client device 224 providing notice to the identified supplier 208 of the one or more unrequested items and requesting instructions for disposition of the one or more unrequested items rejected by the unrequested item resolution component 218.

The client device 224 outputs resolution instructions 234 to the computing device 202 in response to the consolidated unrequested item notification 232. The resolution instructions 234 instruct the receiving center 204 to return the one or more unrequested items to the identified supplier 208 or donate the one or more unrequested items to a charitable aid agency or other charitable organization, such as, but not limited to, a recognized 501(c) (3) non-profit organization.

In some non-limiting examples, if the one or more unrequested items are hazardous, regulations prevent return, or otherwise the items are otherwise unsuitable for return or donation, the resolution instructions 234 may instruct the receiving center 204 to destroy the one or more unrequested items.

In this example, the scanner device 212 is incorporated into or attached to the client device 216. In other examples, the scanner device 212 may be a separate device from the client device 216. In this example, the scanner device 212 transmits the scan data 214 to the client device 216 via a beacon, WI-FI, BLUETOOTH brand communication module, network connection, or other data transmission device.

The scanner device 212 in some examples identifies issues with items sent by the supplier. The scanner device 212 scans cases or boxes of shipment. The scan may be product type dependent. If the scanner device 212 scans an item which does not conform to an open order, the scanner device 212 or the client device 216 may generate an alert, notification, or other output indicating a scanned pallet, case, or box is non-conforming/unrequested.

Scanning a non-conforming case or box may trigger creation of a remedy ticket for the unrequested items. In some examples, if the scan data indicates a scanned case, box or item is non-conforming/unrequested, the scan data triggers the remedy ticket generator to generate a remedy ticket for the scanned units/cases/boxes that are unrequested.

In some non-limiting examples, if an unrequested item is accepted, a drone delivery device 240 may be utilized to deliver/transport the unrequested item to a delivery location. The delivery location is a destination for the accepted item. The delivery location in some examples is an online user's address where an item is going to be delivered to fulfill an online order. The delivery location in other examples is a store/retail location, warehouse or other location. The delivery location in still other examples is pickup location, such as an item pickup kiosk or item pickup locker location. In still other examples, the delivery location is an area or space within a distribution center or warehouse where the accepted item will be stored within the distribution center/warehouse.

Figure 3:
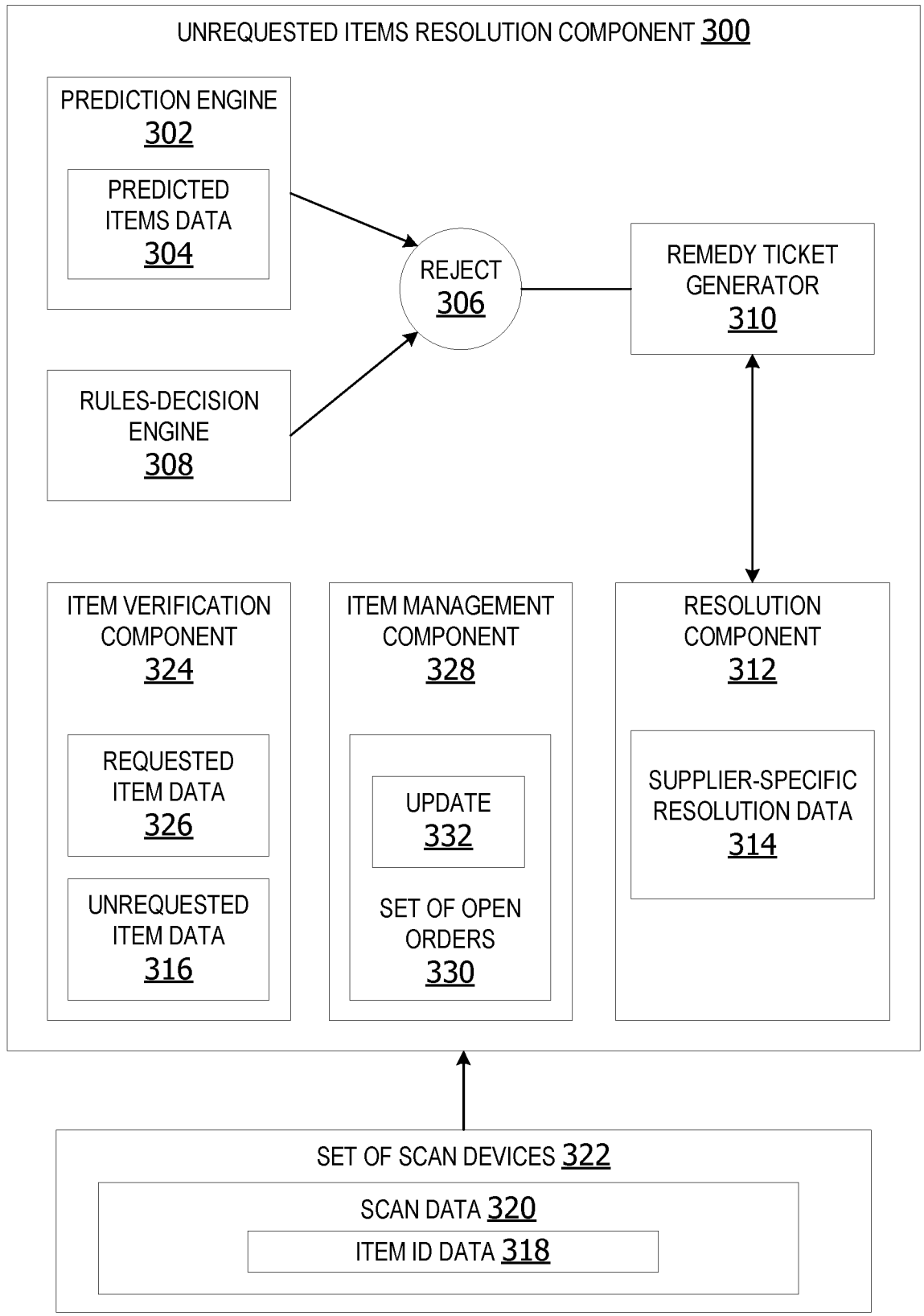
FIG. 3 is an exemplary block diagram illustrating an unrequested item resolution component.

FIG. 3 is an exemplary block diagram illustrating an unrequested item resolution component. The unrequested item resolution component 300 may include a prediction engine 302 that generates predicted items data 304 describing one or more predicted items that may be ordered in the future. The prediction engine 302 includes algorithms for analyzing data and generating data-driven predictions based on prediction modeling and pattern recognition.

The prediction engine 302 utilizes context data to predict items which may be in demand at different location. One item may be requested in greater quantities in one state, county, or city and different in another. Likewise, one item may be more popular or more preferred in one region or neighborhood and less popular in another. For example, in one neighborhood organic food items may be in greater demand while in another similar neighborhood there may be less interest in organic foods. Likewise, in one city coffee may be more popular than soda while in another city drinking fruit and/or vegetable juices may be more popular than tea or coffee. The prediction engine utilizes historical trends, past purchases and order history, local, regional, and cultural preferences, items associated with holidays and local celebrations, etc. to generate item prediction data.

The prediction engine 302 compares unrequested items with the generated predicted items data 304. The predicted items data 304 includes data identifying a set of one or more items which have not been ordered or requested but which have been predicted to be needed or requested from the supplier within a per-item predetermined future time. The prediction engine 302 generates the set of predicted items based on real-time context data, order history data, planned item orders, and predicted future demand trends.

For example, if order history data indicates that the week of Valentine's Day sales of cake mix increases by fifteen percent or 100 additional cases, the prediction engine 302 may generate a set of predicted items that includes 100 additional cases of cake mix for the week prior to Valentine's Day. If a set of unrequested items received February 7 includes fifty cases of cake mix, the prediction engine may accept the fifty cases of unrequested cake mix based on the predicted items data 304 indicating an increased demand for cake mix this time of year, for example.

The prediction engine 302 may analyze unrequested item data associated with one or more unrequested items received from a supplier using predicted items data 304. The prediction engine 302 generates an accept notification on determining the one or more unrequested items conforms to at least one predicted item in the predicted items data 304. The prediction engine 302 generates a reject 306 notification on determining the predicted items data 304 excludes the one or more unrequested items. In other words, if the prediction engine 302 predicts that the unrequested item(s) will be needed in the near-future, the prediction engine 302 accepts the unrequested item(s). However, if the prediction engine 302 does not anticipate the unrequested items being needed in the near-future based on context data, seasonal demand, historical needs, and other item-related data, the prediction engine 302 rejects the unrequested item(s).

The unrequested item resolution component 300 may include a rules-decision engine 308. The rules-decision engine 308 may analyze the unrequested item data 316 to determine whether to accept or reject the one or more unrequested items. The rules-decision engine 308 generates the reject 306 notification on determining the one or more unrequested items do not conform to a set of per-item constraints.

A remedy ticket generator 310 generates a remedy ticket associated with the one or more unrequested items on receiving the reject 306 notification from both the prediction engine 302 and the rules-decision engine 308. In other examples, the remedy ticket generator 310 generates a remedy ticket for the one or more unrequested items if the reject 306 notification is received from either the prediction engine 302 or the rules-decision engine 308.

A resolution component 312 in some examples extracts supplier-specific resolution data 314 from a plurality of remedy tickets associated with the same identified supplier. A consolidated notification, including the extracted supplier-specific resolution data 314 is sent to the identified supplier.

In some examples, an unrequested item is identified using item ID data 318 obtained from scan data 320. The scan data 320 is data generator by a scanner device in a set of one or more scan devices 322 used by one or more users to scan items received from one or more suppliers. The set of scanners scan a barcode, data matrix code, RFID tag, or other identification on an item to generate the scan data 320.

A verification component 324 obtains the scan data 320 from the set of scan devices 322. The verification component 324 extracts item ID data 318 for at least one item received from the supplier from the scan data 320. The verification component 324 analyzes the item ID data 318 with requested item data 326 to verify the at least one item received from the supplier corresponds to at least one item requested from the supplier. If an item received from the supplier is a requested item, the item is an ordered item and it is accepted.

The verification component 324 in another example analyzes the unrequested item data 316 with requested item data 326 associated with one or more items requested from the supplier in a set of unfulfilled open orders to determine whether the one or more unrequested items conforms to at least one item in at least one unfulfilled open order. If an unrequested item conforms to an item in an unfulfilled open order, the item is accepted. The unfulfilled open order is modified to reflect acceptance of the unrequested item. For example, if the unexpected item is a case of packing tape and there is a pre-existing open order requesting ten cases of packing tape from the same supplier, the case of packing tape is accepted. The unfilled open order is updated to request only nine cases of packing tape. The updated open order may include a line acknowledging receipt of the unrequested case of packing tape.

An item management component 328 generates an update 332 for at least one open order in a set of open orders 330 to the supplier of the one or more unrequested items in response to accepting the one or more unrequested items. The at least one open order is updated in real-time to reflect acceptance of the one or more unrequested items.

Figure 4:
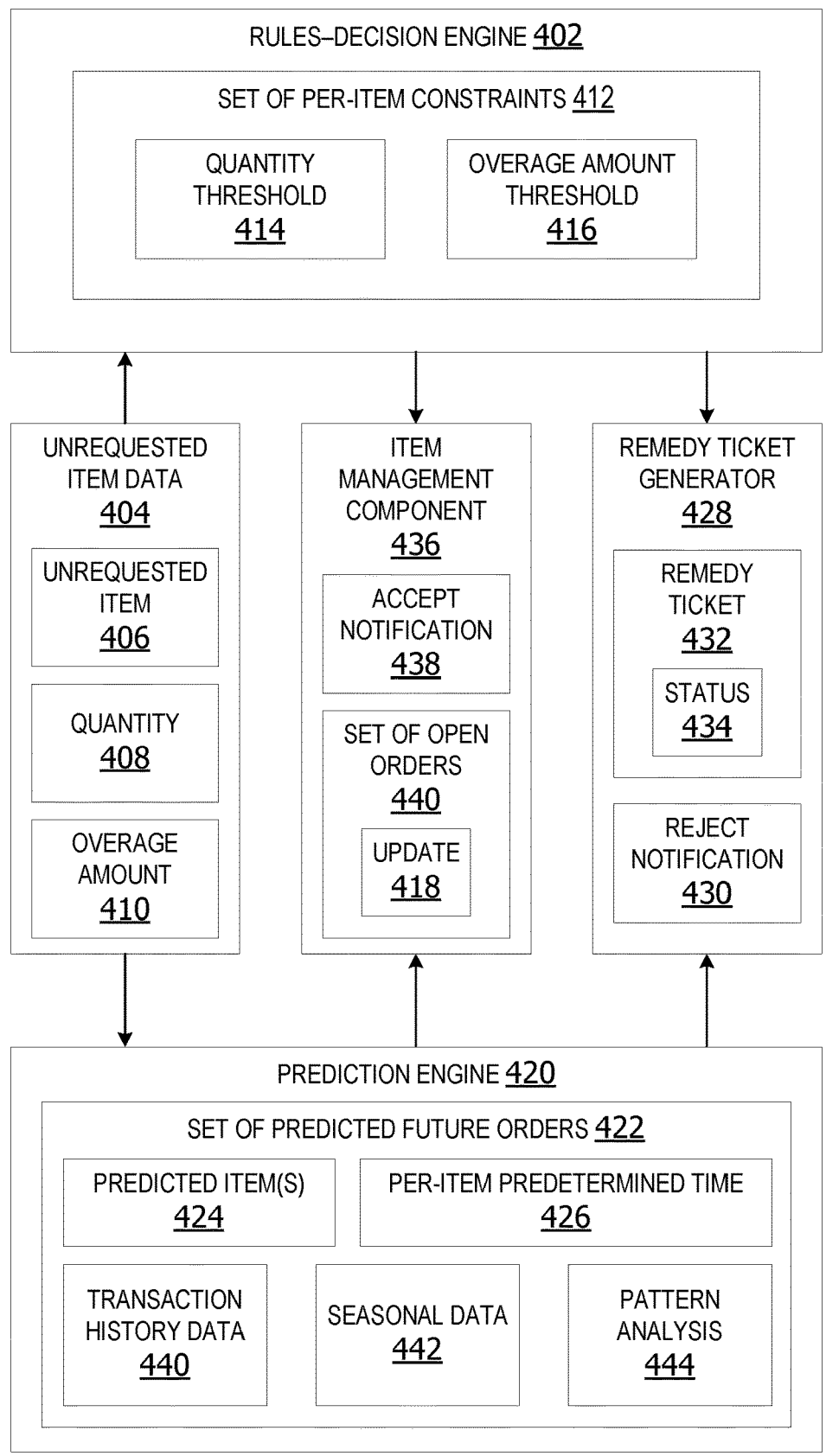
FIG. 4 is an exemplary block diagram illustrating an unrequested item resolution component for accepting or rejecting unrequested items.

FIG. 4 is an exemplary block diagram illustrating an unrequested item resolution component for accepting or rejecting unrequested items. The unrequested item resolution component may include a rules-decision engine 402. The rules-decision engine 402 analyzes unrequested item data 404 describing at least one unrequested item 406, quantity 408, and overage amount 410. The quantity 408 indicates the number of items or how many instances of the unrequested item is received. The overage amount 410 is an amount over what was already paid, already billed, or agreed payment. In this example, the overage amount 410 is the amount that the receiving party would pay to the supplier over what was already agreed due to accepting the unrequested/un-ordered items.

For example, if eighty cases of bottled water are ordered but one-hundred cases of bottled water are received, the quantity 408 of the unrequested item is twenty cases. If the receiving party agreed to pay $500.00 for the eighty cases of bottled water, the overage amount 410 may be $125.00 for the additional twenty cases.

The rules-decision engine 402 analyzes the unrequested item data 404 using a set of per-item constraints 412. The set of per-item constraints 412 includes one or more rules for determining whether to accept or reject a type of unrequested item. The set of per-item constraints 412 may include a quantity threshold 414 and/or an overage amount threshold 416. The rules-decision engine 402 in some examples compares the quantity 408 with the quantity threshold. If the quantity of the unrequested item is below a quantity threshold, the rules-decision engine 402 accepts the unrequested item. If the quantity 408 is greater than the threshold, the unrequested items are rejected.

In one example, if fifty cases of children's socks are received but the quantity threshold for the children's socks is thirty cases, the fifty cases of socks are rejected because they exceed the threshold. In another example, if ten unrequested cases of socks are received, the ten cases are below the thirty cases threshold. In this example, the ten unrequested cases of socks may be accepted. In yet another non-limiting example, if forty cases of children's socks are received, thirty cases of socks falling within the thirty cases threshold may be accepted while the ten additional cases exceeding the threshold are rejected.

The rules-decision engine 402 in other examples compares the overage amount 410 with the overage amount threshold 416. If the overage amount 410 of the unrequested item is below an overage amount threshold 416, the rules-decision engine 402 accepts the unrequested item. If the overage amount exceeds the overage amount threshold 416 the unrequested items are rejected. For example, if the overage amount is $3000 for unrequested cases of sleeping bags and the overage amount threshold for sleeping bags is $2000, the unrequested sleeping bags are rejected.

In another example, a quantity of sleeping bags having an overage amount equal to the threshold are accepted and the remainder are rejected. For example, if twenty cases of sleeping bags would equal $2000 in overages, but thirty cases of unrequested sleeping bags are received, the twenty cases falling within the threshold overage amount may be accepted while the other ten cases of unrequested sleeping bags are rejected because those items would exceed the threshold amount.

In another example, the rules-decision engine 402 only accepts the unrequested item if both the overage amount 410 is below the overage amount threshold 416 and the quantity is also below the quantity threshold 414. If the overage amount 410 is above the overage amount threshold 416 or the quantity is above the quantity threshold 414, the rules-decision engine 402 rejects the unrequested item.

The set of constraints 412 in other examples includes constraints for assembly items which float through the receiving center temporarily before being shipped to a recipient without being stored in a warehouse. For example, if an unrequested item is an assembly item, the item may be accepted if the overage amount is less than an overage amount threshold of $2,000, the quantity of cases is no more than double the line value (overage amount is no more than double the actual amount on the open order).

The set of constraints 412 may include constraints for staple stock or warehoused items. For example, an unrequested item that is a warehoused item may be accepted if the overage amount is less than or equal to an overage amount threshold of $2,000 and the warehouse on-hand quantity is less than four weeks-on-hand (WOH). The WOH may be maintained dynamically in a database or other data store.

The per-item set of constraints 412 for assembly produce items may vary due to the relatively short shelf-life of perishable items. In one example, unrequested product items are accepted. The overage amount is added to an open order if (1) there is an active line item on an open order, (2) the overage does not exceed an overage amount threshold of $4000, and (3) the cases are no more than double the line value.

The per-item set of constraints 412 for warehoused produce items, in one example, may include constraints stating that the items may be accepted if the overage amount is no more than $1000 and the WOH quantity is no more than two WOH.

In another example, the per-item set of constraints 412 for unrequested non-warehoused, non-perishable items, such as shoes, may include constraints stating that the items may be accepted if there is an active line item on an open order, the overage amount is less than a threshold of $8000, and the cases are no more than double the line value.

The per-item set of constraints 412 in yet another example, for warehoused non-perishable items, such as the shoes may include constraints stating that the overage shoes may be accepted if the overage amount is no more than $10,000 and the WOH quantity is no more than six WOH. The WOH in this example is longer than the WOH for the perishable product items because the shoes are non-perishable and may be stored longer.

The prediction engine 420 generates a set of predicted items 422 which have not been requested but are predicted to be needed within a per-item predetermined time 426. The per-item predetermined time 426 is a time-period until the item will be needed during which an unrequested item may be accepted. For example, milk may have a shorter per-item predetermined time 426 of five days to account for the short shelf-life of dairy products. If the prediction engine 420 generated one or more predicted item(s) 424 predicts that fifty additional cases of milk will be needed in three days to account for increased demand over a holiday weekend, unrequested cases of milk received within five days of the predicted demand may be accepted. However, if additional unrequested cases of milk are received two weeks prior to the predicted increase in demand for milk, the prediction engine will not accept the unrequested milk cases.

In another example, the per-item predetermined time 426 for chips, which has a longer shelf life, may be ten days. If the prediction engine 420 predicts an increase demand for chips three days prior to a popular sporting event, the prediction engine 420 may accept additional unrequested cases of chips anytime within the ten-day period prior to the predicted increased demand. However, if the un-ordered chips arrive one month prior to the predicted increased demand, the prediction engine rejects the unrequested cases of chips because they are not received within the predetermined time prior to the anticipated need. This prevents storage of excessive amounts of items which are not going to be wanted for an unacceptably long period-of-time. The predetermined time is different for different types of items to reflect differing storage requirements, refrigeration, freezing, shelf-life, etc.

The item management component 436 generates an update 418 of a set of one or more open order(s) 440 to the supplier of the one or more unrequested items in response to the rules-decision engine 402 and the prediction engine 420 accept the one or more unrequested items. The item management component 436 receives the accept notification 438 from the rules-decision engine 402 and/or the prediction engine 420. The open order(s) are updated in real-time to reflect acceptance of the set of unrequested items. The updated open order(s) are sent to the supplier. In this example, if the unrequested item(s) are accepted and a pre-existing open order is updated to reflect the accepted item(s), no remedy ticket is generated.

In other examples, the prediction engine 420 analyzes transaction history data 440 and/or seasonal data 442 associated with items typically purchased at different times/seasons of the year using pattern analysis 444 (machine learning). The prediction engine 420 generates the set of predicted future orders 422 associated with a selected supplier based on the results of the analysis of the transaction history data 440 and seasonal data 442.

The set of predicted future orders in some examples includes predicted replenishment orders which have not been made/scheduled, but which are predicted to occur based on the analysis. The set of predicted future orders may also include predicted manual orders which have not been manually created but which are predicted based on the analysis results. In still other examples, the set of predicted future orders includes predicted future online orders. An online order is an order created via a webpage or other online/Internet based method. For example, if a user orders an item via a store website, the order is an online order. An online order may specify the ordered item be mailed or delivered to the user's home or business address. In other examples, an online order may include an item ordered via a webpage for pickup at a brick-and-mortar store location. The set of predicted future orders includes orders predicted for one or more stores/locations in a plurality of retail store locations.

In other examples, if a remedy ticket was generated for the unrequested item(s) that are accepted, the status of the remedy ticket is updated to indicate that the remedy ticket for the unrequested item(s) that have been accepted is resolved. In other words, one or more open orders are updated to reflect the accepted items and the status of the remedy ticket associated with the accepted items is changed from unresolved to resolved.

If a remedy ticket generator 428 receives a reject notification 430 from both the rules-decision engine 402 and the prediction engine 420 rejecting the unrequested item(s), the remedy ticket generator 428 generates a remedy ticket 432 for the unrequested item(s). The remedy ticket 432 identifies the supplier that sent the unrequested item(s), identifies the unrequested items, and requests instructions for disposition of the unrequested item.

In some examples, the remedy ticket includes a status 434. If the remedy ticket has an open status, the resolution of the unrequested item(s) has not yet been determined. In other words, prior to sending a consolidated notification to the supplier that includes extracted supplier-specific resolution data, the status of the remedy ticket is open or unresolved. Following receipt of resolution instructions from the supplier or a decision to accept the unrequested items, the status of the remedy ticket 432 is changed to a closed or resolved status.

In another example, the unresolved remedy ticket 432 is stored with a plurality of remedy tickets that are also unresolved. The unrequested item resolution component changes the status 434 of the remedy ticket 432 from unresolved status to resolved status on receiving verification from the at least one user, such as a manager, confirming that resolution instructions received from the identified supplier have been implemented regarding the unrequested item(s). If the resolution instructions instruct the receiving center to return the item, the remedy ticket is updated to resolved status when the unrequested items have been shipped back to the supplier. When the remedy ticket status is changed to resolved, the remedy ticket is removed from the plurality of unresolved remedy tickets.

In the example shown in FIG. 4, the remedy ticket generator 428 is included within the unrequested item resolution component. In other examples, the remedy ticket generator 428 is a separate component from the unrequested item resolution component, as shown in FIG. 1 above.

Figure 5:
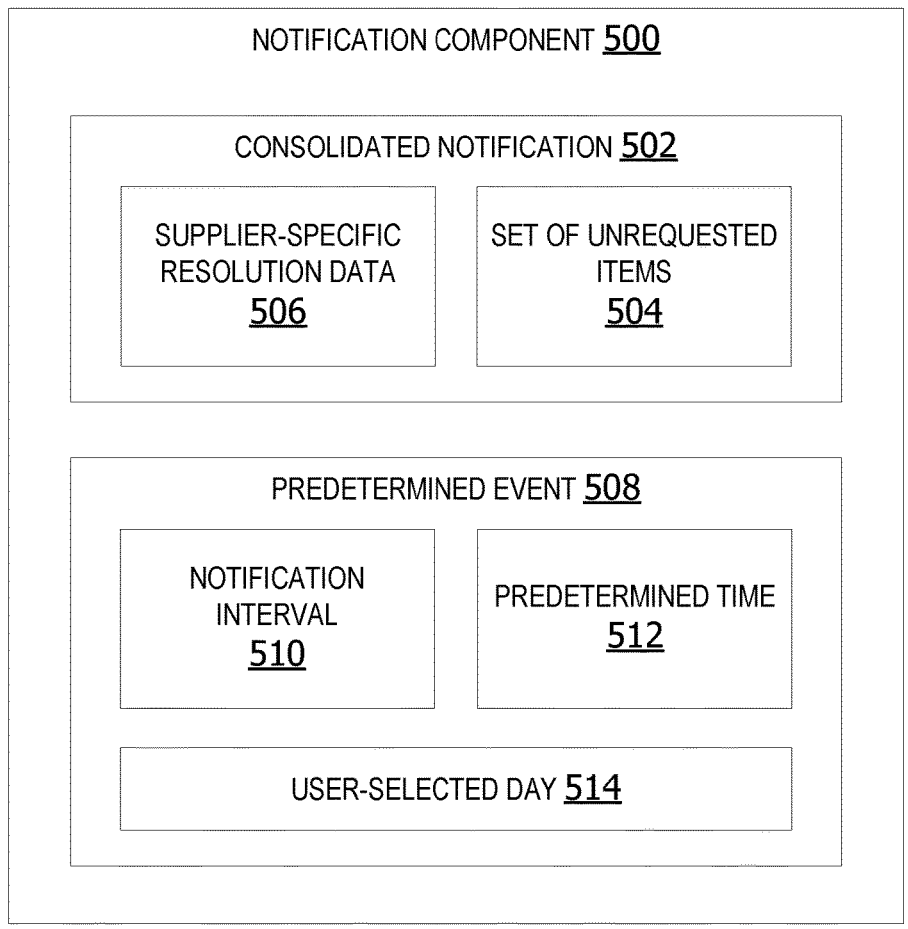
FIG. 5 is an exemplary block diagram illustrating a notification component.

FIG. 5 is an exemplary block diagram illustrating a notification component. The notification component 500 in this example generates a consolidated notification, including supplier-specific resolution data 506 for a set of unrequested items 504. The notification component 500 generates the consolidated notification 502 and sends the consolidated notification 502 to the identified supplier at an occurrence of a predetermined event 508. The predetermined event 508 is a supplier-specific predetermined event. The predetermined event may be a different event for each supplier.

The predetermined event 508 may be a notification interval 510. The notification interval 510 may be a time-span or recurring date. For example, the notification interval 510 may be an interval of twelve-hours, twenty-four hours, forty-eight hours, or any other interval. If the notification interval 510 is twenty-four hours, the notification component 500 sends a consolidated notification associated with an identified supplier to that identified supplier every twenty-four hours.

In another example, the predetermined event 508 includes a predetermined time 512. The predetermined time 512 is a pre-selected time occurring each day. For example, the predetermined time 512 may be 7:00 a.m. In this example, the notification component 500 generates and sends the consolidated notification 502 each day at 7:00 a.m. A consolidated notification may be generated for each supplier in the plurality of suppliers each day at 7:00 a.m., or the predetermined time may be different for each supplier.

The predetermined event 508 may include a user-selected day 514. The user-selected day may be a given day on which the consolidated notification is sent. For example, a consolidated notification for a given supplier may be Mondays, Tuesday, and Wednesday while the predetermined event for another supplier may be every Monday, Wednesday, and Friday. A consolidated notification may be generated for another supplier every weekday.

Figure 6:
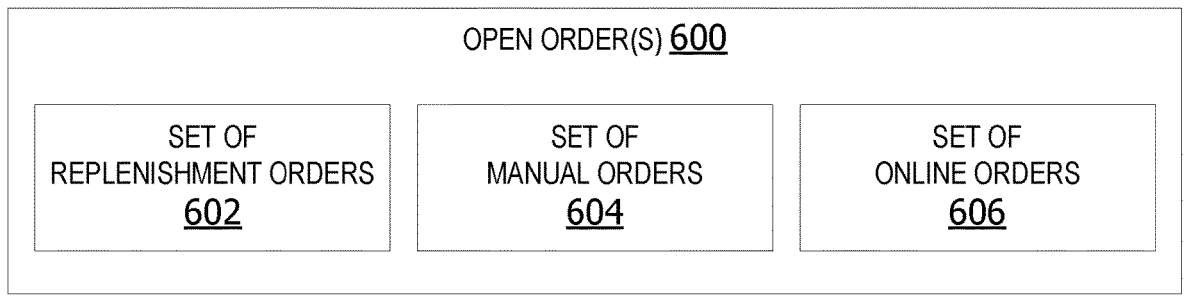
FIG. 6 is an exemplary block diagram illustrating a set of open orders.

FIG. 6 is an exemplary block diagram illustrating a set of one or more open orders 600. The open order(s) 600 includes a set of one or more replenishment orders 602, a set of one or more manual orders 604 and/or a set of one or more online orders 606. A replenishment order is an automatic order to replenish or restock inventory items. A manual order is a non-replenishment order entered/created manually by a manager or other qualified user. An online order is an order created by a user remotely via a website/webpage or other online order page. Items ordered via an online order may be delivered to an address provided by the user creating the order or picked up by the user at a pickup location, such as, but not limited to, a store, item pickup kiosk, item pickup locker or other location.

Figure 7:
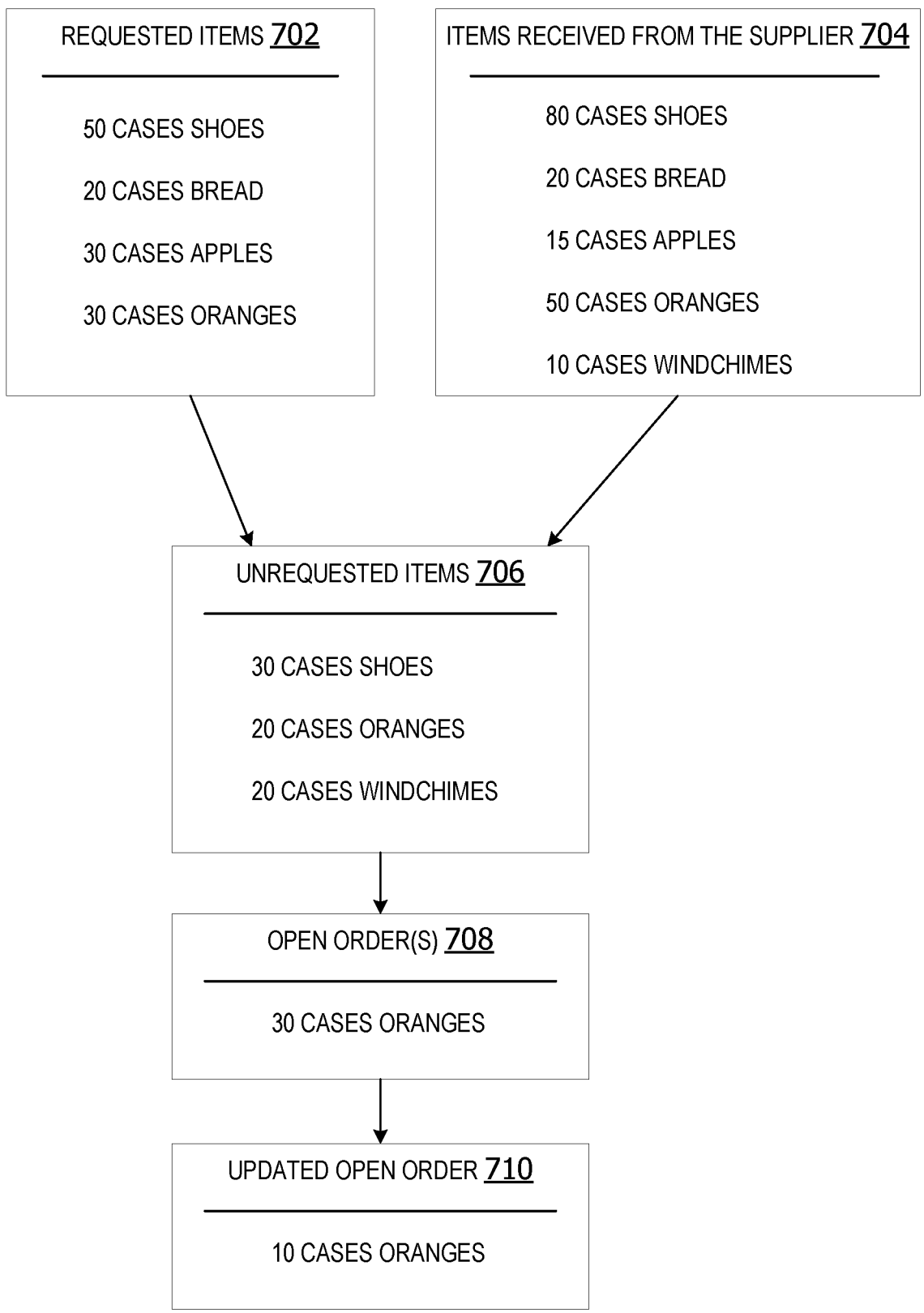
FIG. 7 is an exemplary block diagram illustrating updating an open order to reflect accepted unrequested items.

FIG. 7 is an exemplary block diagram illustrating updating an open order to reflect accepted unrequested items. In one non-limiting example, the requested items 702 ordered from the identified supplier includes fifty cases of shoes, twenty cases of bread, thirty cases of apples, and thirty cases of oranges. If the items received from the supplier 704 includes eighty cases of shoes, twenty cases of bread, fifteen cases of apples, fifty cases of oranges, and ten cases of windchimes, the unrequested items 706 is determined by comparing the requested items 702 with the items received from the supplier 704.

In this example, the unrequested items 706 includes thirty cases of shoes, twenty cases of oranges, and twenty cases of windchimes. If one or more unfulfilled open order(s) 708 includes any of the unrequested items, the unrequested items may be accepted. In this example, if an open order includes thirty cases of oranges, the unrequested twenty cases of oranges may be accepted. The open order(s) 708 for the thirty cases of oranges are updated to reflect the accepted unrequested twenty cases of oranges by reducing the open order(s) 708 from thirty cases to only ten cases in the updated open order 710.

In this example, the ten cases of windchimes are unrequested items because windchimes were not requested. However, if the windchimes are predicted by the prediction engine as items which may be in demand within a predetermined time, the prediction engine may accept the windchimes.

FIG. 7 is an exemplary flow chart illustrating operation of the computing device to accept or reject unrequested items. The process shown in FIG. 7 may be performed by an unrequested item resolution component executing on a computing device, such as, but not limited to, the computing device 102 in FIG. 1 and/or the computing device 202 in FIG. 2.

The process begins by analyzing unrequested item data using a set of per-item constraints and predicted items data associated with a given supplier at operation 702. The data is analyzed by a component, such as the unrequested item resolution component 112 in FIG. 1, the unrequested item resolution component 218 in FIG. 2, and/or the unrequested item resolution component 300 in FIG. 3.

The unrequested item resolution component determines whether to accept the unrequested item(s) at operation 704. The unrequested item resolution component determines whether to accept the unrequested item(s) based on the results of the analysis of the data using the set of per-item constraints, such as the set of per-item constraints 412 in FIG. 4.

If the unrequested item(s) are not accepted at operation 704, a remedy ticket is generated for the unrequested item(s) at operation 704. The process terminates thereafter.

The remedy ticket is a ticket identifying unrequested item(s) associated with an identified supplier, such as the remedy ticket 432 in FIG. 4. The remedy ticket is generated by a remedy ticket generator, such as the remedy ticket generator 114 in FIG. 1, the remedy ticket generator 310 in FIG. 3, and/or remedy ticket generator 428 in FIG. 4.

Returning to operation 704, if the unrequested item(s) are accepted at operation 704, the unrequested item resolution component generates a new open order to the supplier at operation 708. The new open order includes the unrequested item(s) accepted by the unrequested item resolution component. The process terminates thereafter.

While the operations illustrated in FIG. 7 are performed by a server or other computing device, aspects of the disclosure contemplate performance of the operations by other entities. For example, a cloud service may perform one or more of the operations.

Figure 8:
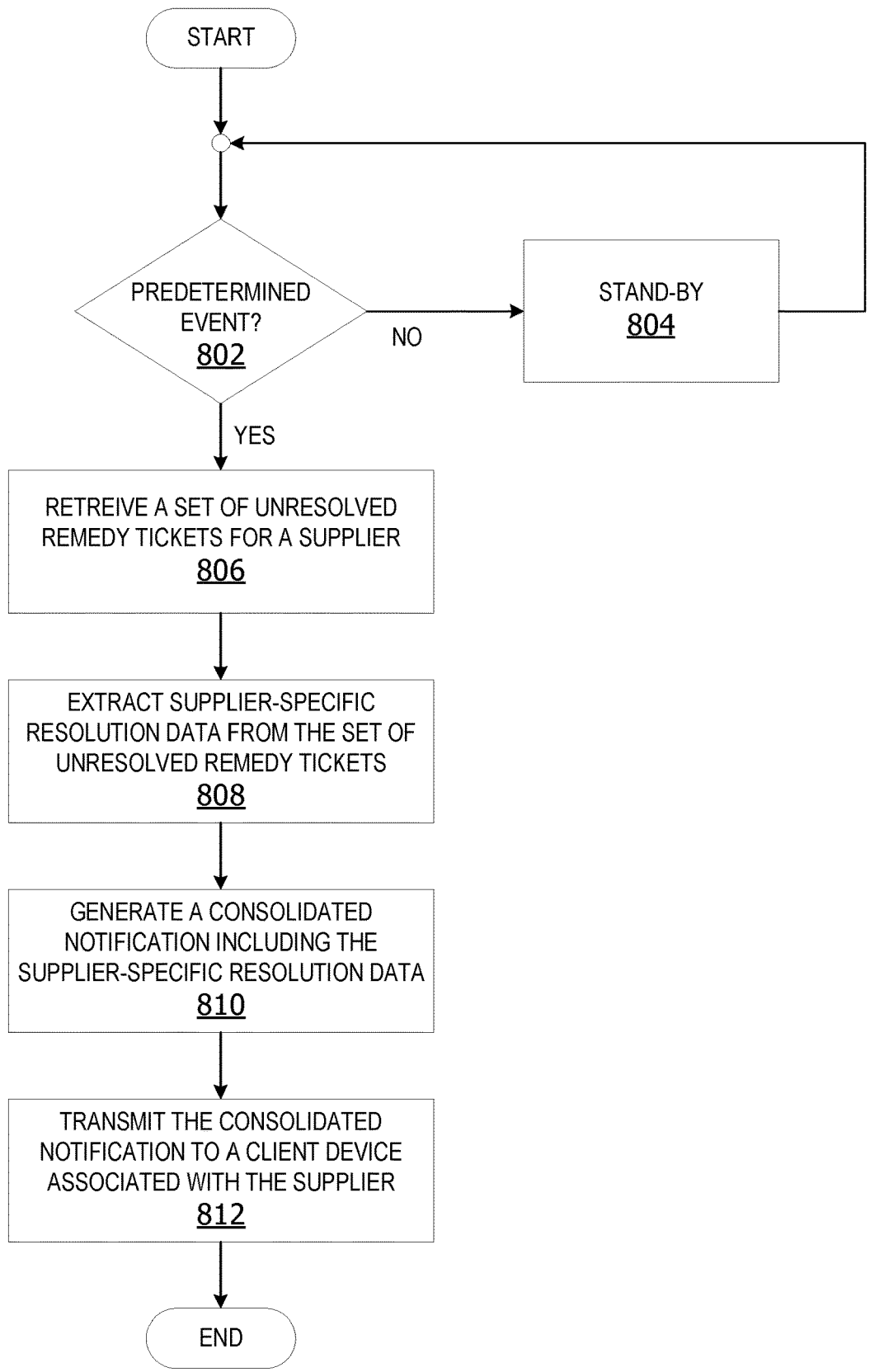
FIG. 8 is an exemplary flow chart illustrating operation of the computing device to create a consolidated notification.

FIG. 8 is an exemplary flow chart illustrating operation of the computing device to create a consolidated notification. The process shown in FIG. 8 may be performed by an unrequested item resolution component executing on a computing device, such as, but not limited to, the computing device 102 in FIG. 1 and/or the computing device 202 in FIG. 2.

The process begins by determining whether a predetermined event has occurred at operation 802. The predetermined event is an event such as the predetermined event 508 in FIG. 5. A notification component determines whether the predetermined event has occurred, such as the notification component 116 in FIG. 1, the notification component 220 in FIG. 2, and/or the notification component 500 in FIG. 5. If the predetermined event has not occurred, the process goes to stand-by at operation 804 until the predetermined event has occurred.

When the predetermined event has occurred at operation 802, a set of unresolved remedy tickets for a supplier are retrieved at operation 806. The set of remedy tickets are retrieved from a plurality of unresolved remedy tickets, such as the plurality of unresolved remedy tickets 120 in FIG. 1 and/or the plurality of remedy tickets 230 at FIG. 2. The set of remedy tickets may be retrieved by the unrequested item resolution component 112 in FIG. 1, the unrequested item resolution component 218 in FIG. 2 and/or the resolution component 312 in FIG. 3.

The resolution component extracts supplier-specific resolution data from the set of unresolved remedy tickets at operation 808. The notification component generates a consolidated notification including the supplier-specific resolution data at operation 810. The notification component is a notification component such as the notification component 116 in FIG. 1, the notification component 220 in FIG. 2, and/or the notification component 500 in FIG. 5.

The notification component transmits the consolidated notification to a client device associated with the supplier at operation 812. The client device is a computing device, such as the client device 126 in FIG. 1 and the client device 216 in FIG. 2. The process terminates thereafter.

While the operations illustrated in FIG. 8 are performed by a server or other computing device, aspects of the disclosure contemplate performance of the operations by other entities. For example, a cloud service may perform one or more of the operations.

Figure 9:
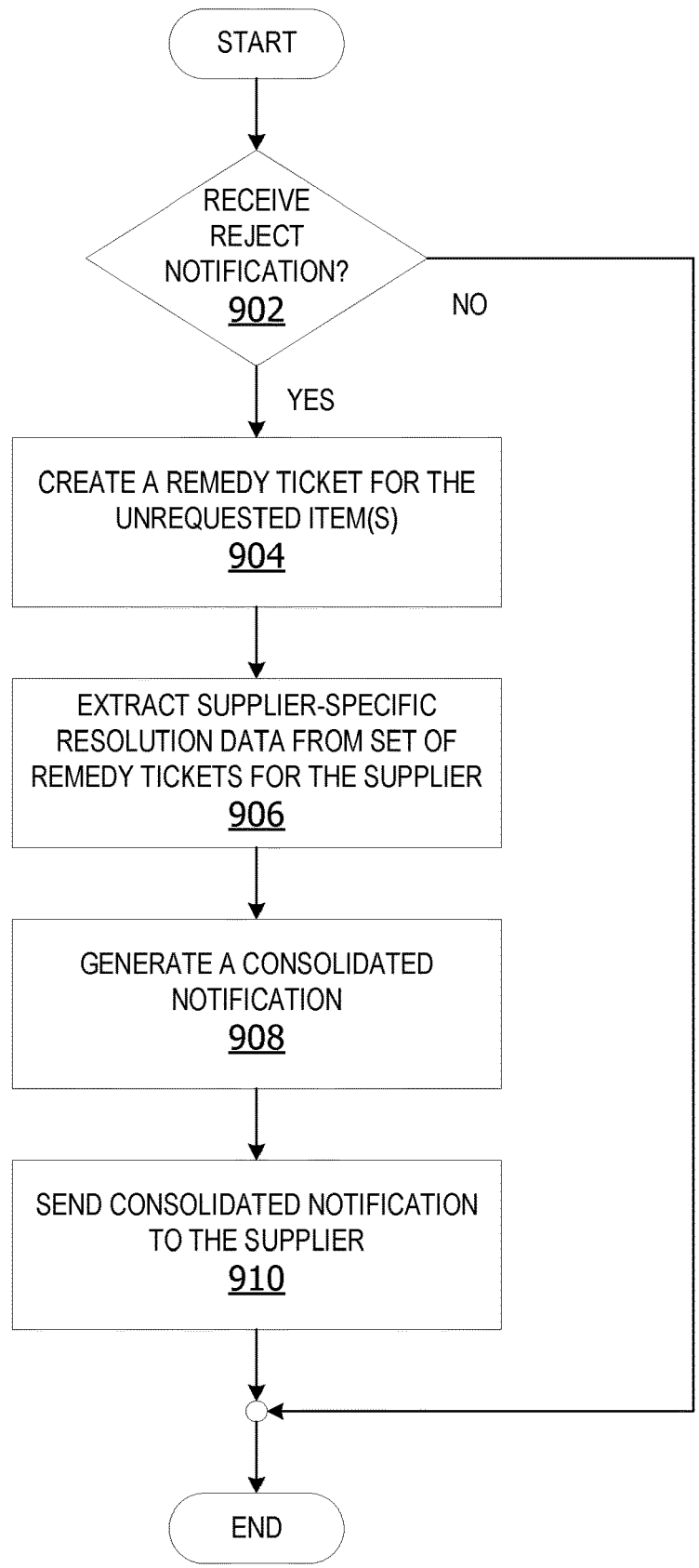
FIG. 9 is an exemplary flow chart illustrating operation of the computing device to send a consolidated notification in response to a reject notification.

FIG. 9 is an exemplary flow chart illustrating operation of the computing device to send a consolidated notification in response to a reject notification. The process shown in FIG. 9 may be performed by an unrequested item resolution component executing on a computing device, such as, but not limited to, the computing device 102 in FIG. 1 and/or the computing device 202 in FIG. 2.

The process begins by determining whether a reject notification is received at operation 902. The reject notification may be received from a rules-decision engine or a prediction engine, such as the rules-decision engine 308 in FIG. 3, the prediction engine 302 in FIG. 3, the rules-decision engine 402 in FIG. 4, and/or the prediction engine 420 in FIG. 4. The reject notification is received by a remedy ticket generator, such as the remedy ticket generator 310 in FIG. 3 and/or the remedy ticket generator 428 in FIG. 4.

The remedy ticket generator creates a remedy ticket for the unrequested item(s) associated with the supplier at operation 904. The supplier-specific resolution data is extracted from a set of remedy tickets for the supplier at operation 906. A notification component generates a consolidated notification at operation 908. The notification component sends the consolidated notification to the supplier at operation 910. The process terminates thereafter.

While the operations illustrated in FIG. 9 are performed by a server or other computing device, aspects of the disclosure contemplate performance of the operations by other entities. For example, a cloud service may perform one or more of the operations.

Figure 10:
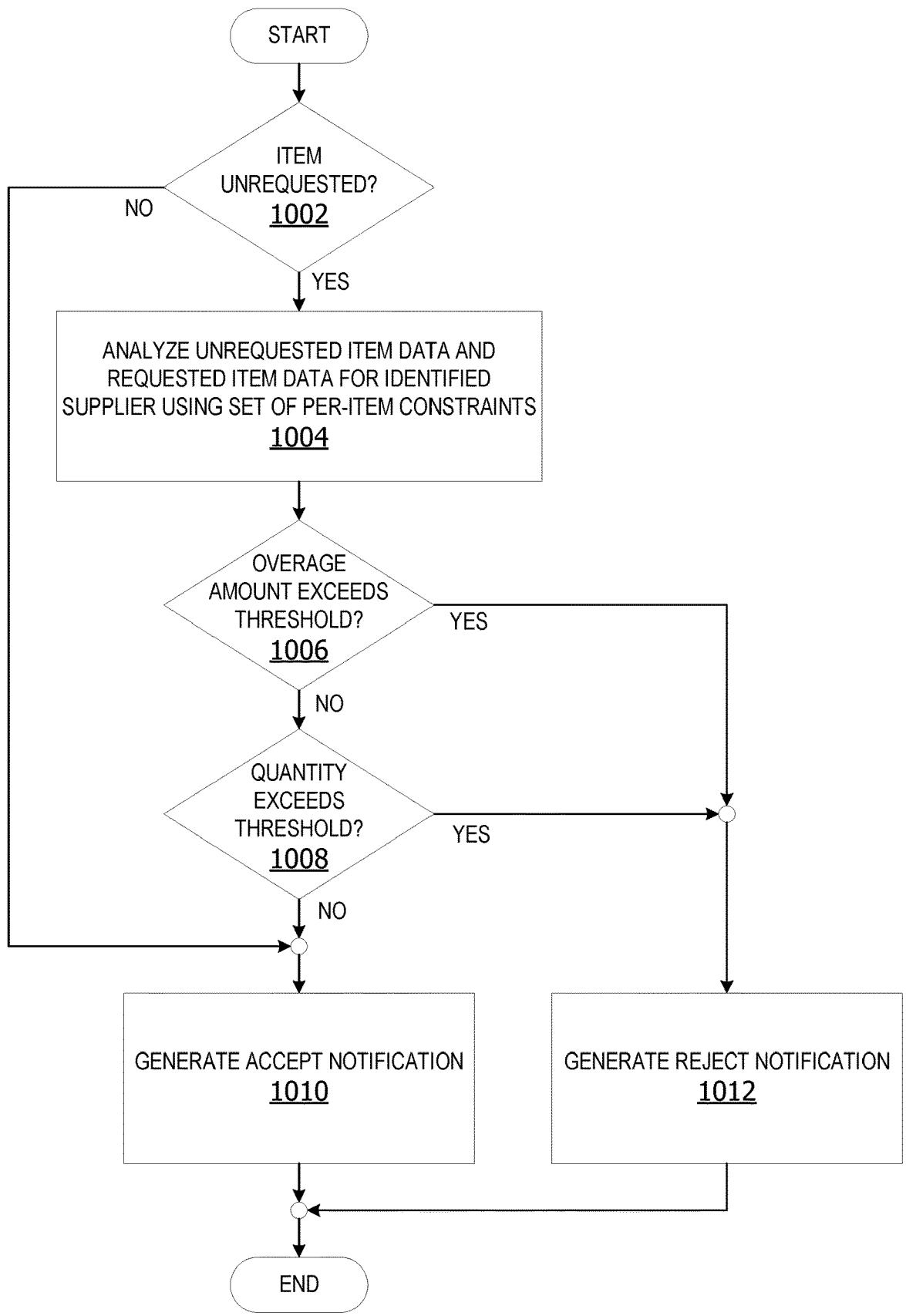
FIG. 10 is an exemplary flow chart illustrating operation of the computing device to analyze unrequested item data using a set of per-item constraints.

FIG. 10 is an exemplary flow chart illustrating operation of the computing device to analyze unrequested item data using a set of per-item constraints. The process shown in FIG. 10 may be performed by an unrequested item resolution component executing on a computing device, such as, but not limited to, the computing device 102 in FIG. 1 and/or the computing device 202 in FIG. 2.

The process begins by determining if an item received from a supplier is unrequested at operation 1002. A verification component compares received item data with requested item data, such as the verification component 324 in FIG. 3. If the received item is not unrequested, an accept notification is generated at operation 1008 by the verification component.

Returning to operation 1002, a rules-decision engine analyzes unrequested item data and requested item data for identified supplier using a set of per-item constraints at operation 1004. The rules-decision engine determines if an overage amount of the unrequested item(s) exceeds an overage amount threshold at operation 1006. If no, the rules-decision engine determines if a quantity of the unrequested item(s) exceeds a quantity threshold at operation 1008. If no, the rules-decision engine generates an accept notification at operation 1010. The process terminates thereafter.

If the rules-decision engine determines that an overage amount exceeds the overage amount threshold at operation 1004, the rules-decision engine generates a reject notification at operation 1012. The process terminates thereafter.

If the rules-decision engine determines that a quantity of the unrequested item(s) exceeds the quantity threshold at operation 1006, the rules-decision engine generates a reject notification at operation 1012. The process terminates thereafter.

While the operations illustrated in FIG. 10 are performed by a server or other computing device, aspects of the disclosure contemplate performance of the operations by other entities. For example, a cloud service may perform one or more of the operations.

Figure 11:
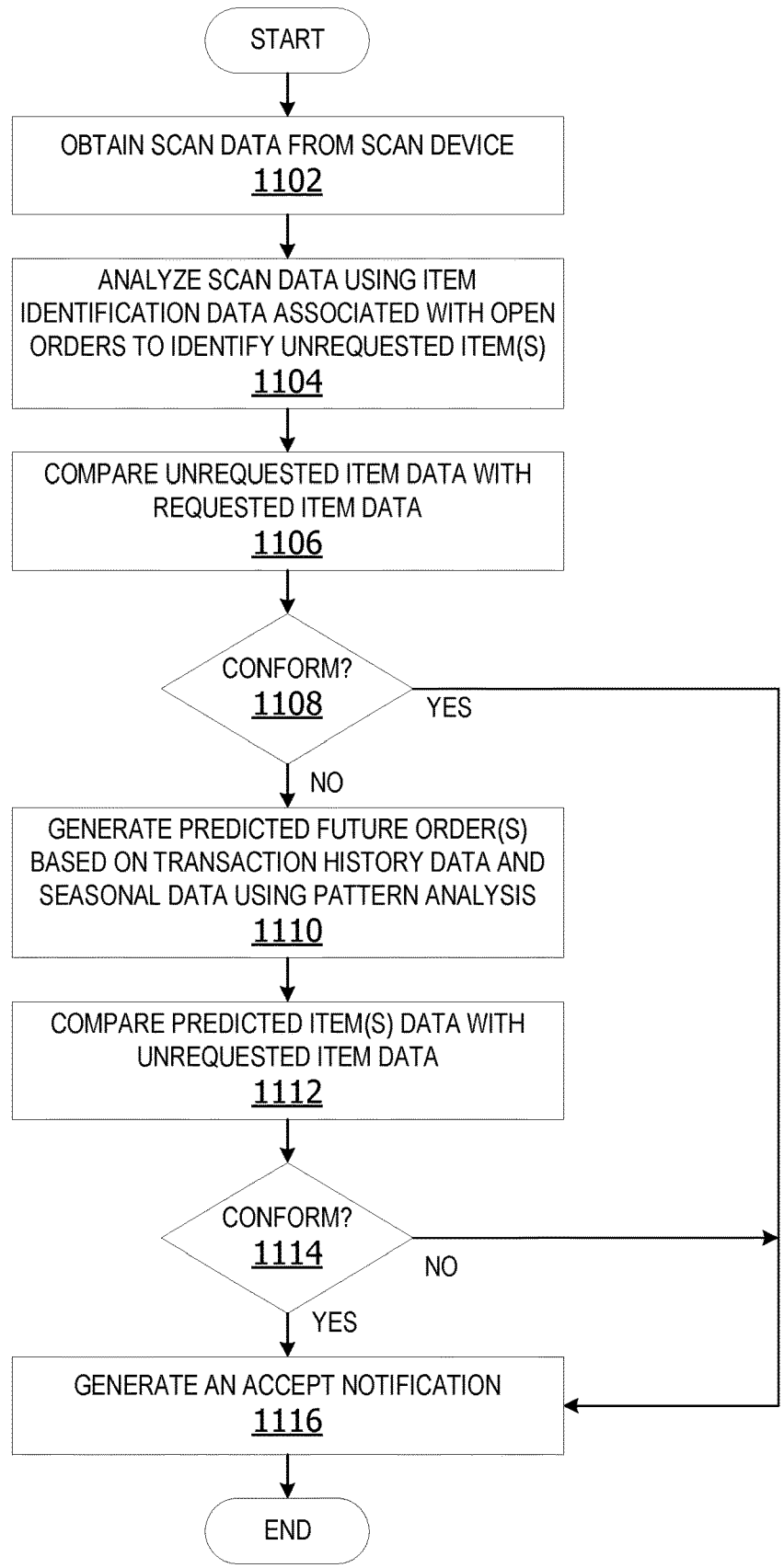
FIG. 11 is an exemplary flow chart illustrating operation of the computing device to resolve receipt of unrequested items.

FIG. 11 is an exemplary flow chart illustrating operation of the computing device to resolve receipt of unrequested items. The process shown in FIG. 11 may be performed by an unrequested item resolution component executing on a computing device, such as, but not limited to, the computing device 102 in FIG. 1 and/or the computing device 202 in FIG. 2.

The process begins by obtaining scan data from a scan device at 1102. The unrequested item resolution component analyzes scan data using item identification data associated with open orders to identify unrequested items at 1104. The unrequested item resolution component compares unrequested item data with requested item data at 1106. The unrequested item resolution component determines if the unrequested item(s) conform with requested item(s) at 1108. If no, the unrequested item resolution component generates predicted future orders based on transaction history data and seasonal data using pattern analysis at 1110. The unrequested item resolution component compares predicted item (s) data with unrequested item data at 1112. The unrequested item resolution component determines if the unrequested item(s) conform with predicted item(s) at 1114. If yes, the unrequested item resolution component generates an accept notification at 1116. The process terminates thereafter.

Returning to 1108, if the unrequested item data conforms to requested item data, the unrequested item resolution component generates an accept notification at 1116. The process terminates thereafter.

While the operations illustrated in FIG. 11 are performed by a server or other computing device, aspects of the disclosure contemplate performance of the operations by other entities. For example, a cloud service may perform one or more of the operations.

Figure 12:
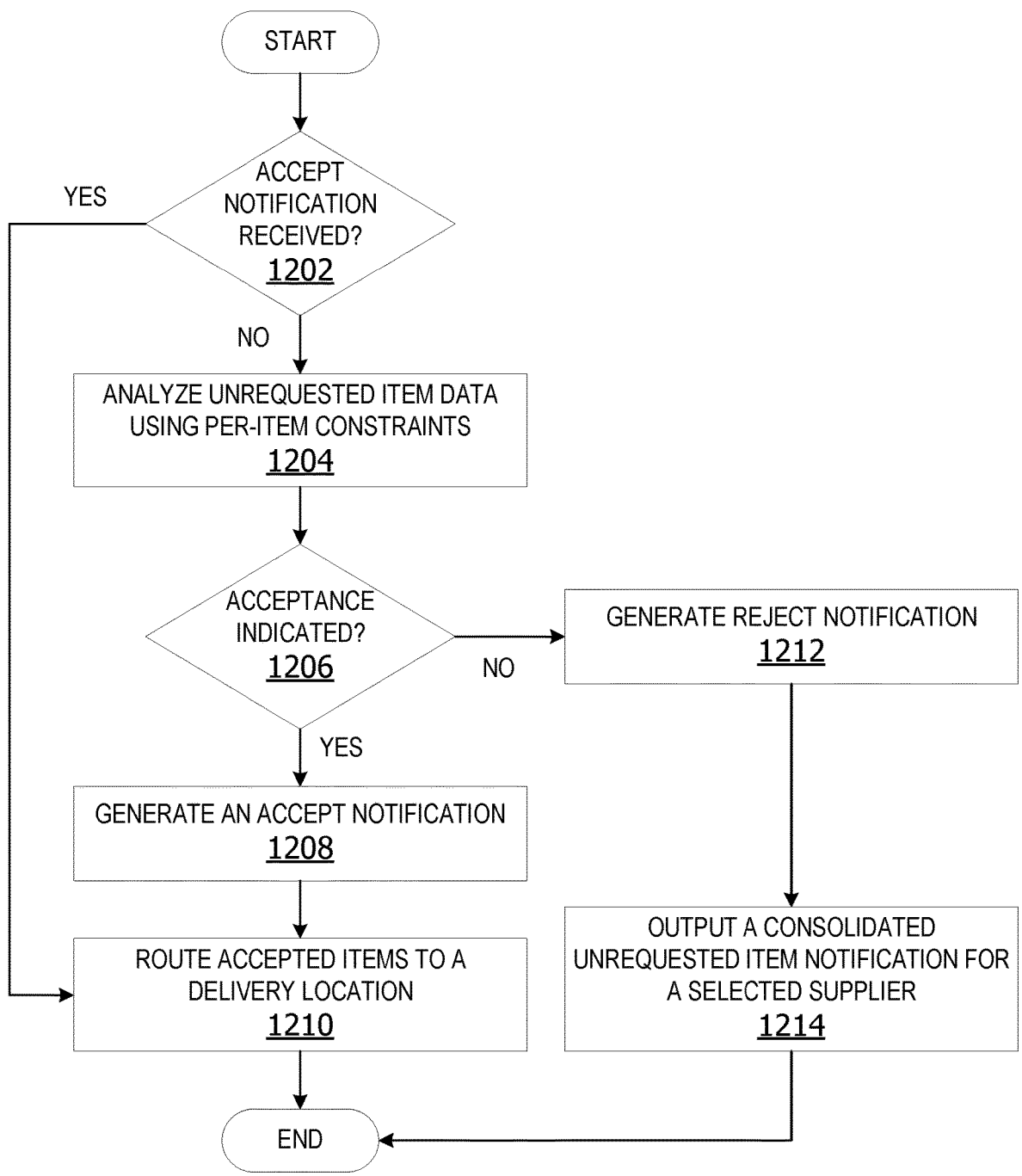
FIG. 12 is an exemplary flow chart illustrating operation of the computing device to generate consolidated unrequested item notifications for a supplier.

FIG. 12 is an exemplary flow chart illustrating operation of the computing device to generate consolidated unrequested item notifications for a supplier.

The process begins by determining whether an accept notification is received for one or more unrequested items at 1202. If no, the unrequested item resolution component analyzes unrequested item data using per-item constraints at 1204. The unrequested item resolution component determines whether the per-item constraints indicate acceptance of the unrequested items at 1206. If yes, the unrequested item resolution component generates an accept notification at 1208. The unrequested item resolution component routes accepted items to a delivery location at 1210. The process terminates thereafter.

If the analysis does not indicate acceptance at 1206, the unrequested item resolution component generates a reject notification at 1212. The unrequested item resolution component outputs a consolidated unrequested item notification for a selected supplier at 1214. The process terminates thereafter.

If the unrequested item resolution component determines an accept notification is received at 1202, the unrequested item resolution component routes the one or more accepted items to a delivery location at 1210. The process terminates thereafter.

While the operations illustrated in FIG. 12 are performed by a server or other computing device, aspects of the disclosure contemplate performance of the operations by other entities. For example, a cloud service may perform one or more of the operations.

ADDITIONAL EXAMPLES

In some examples, the unrequested item resolution system automates and streamlines the remedy process when a supplier ships the wrong quantity of a product or the wrong product to a distribution center or other receiving center. The unrequested item resolution component may compile all a supplier's unrequested items issues into a single, consolidated communication each day or each instance of a predetermined event. A rules-based engine may assist in unrequested item accept or reject decision making. For conditions that follow the per-supplier constraint rules, an easy resolution may be made without escalating beyond the receiving manager(s).

The resolution component may automatically extract each of a supplier's unresolved remedy tickets. The resolution component extracts relevant data from the remedy tickets to create a consolidated notification email with all the information required to obtain resolution instructions from the supplier.

In one non-limiting example, a user associated with a distribution center scans freight and discovers the freight includes one or more unrequested items. If the unrequested items are overages which are not included on any open orders, the unrequested item resolution component looks at what is on the way (WOW) and determines if the overage is worth accepting and sending through to one or more stores. If the unrequested item is accepted, the unrequested item resolution component adds a line to an existing open order or creates a new open order with the accepted unrequested items. This may avoid thousands of remedy tickets and save millions of dollars in cost spent on resolving remedy tickets.

In some examples, if a store has a manual order which conforms to one or more unrequested items, the system will use the overage quantity to fill the manual order first. If an overage is received, the unrequested item resolution component may communicate upstream back to the supplier and influence future orders so the supplier ships according to what the distribution center orders.

Depending on the size of the overage and if the overage is a cross-dock (assembly) item not warehoused in the distribution center, the system determines if a dynamic temporary distribution center slot is warranted to fulfill future demand of the stores the distribution center serves. The system may change item alignment dynamically to allow stores to pull the items stored in warehouses or in distribution centers first. The system may account for order changes/updates needed to supplier.

The unrequested item resolution component automatically checks inventory and open orders for all stores aligned with distribution center that receives the unrequested item to determine where the unrequested items in the excess freight may be sent to enable the unrequested items to be used where those items may be desired. If twenty-five extra cases of crackers are received, the unrequested item resolution component determines where the extra twenty-five cases may be sent to allow the extra cases to be sold without backing up inventory or taking up storage space in a warehouse.

In some example, the rules-decision engine analyzes cost components. For example, if the unrequested item is an inexpensive item, it might be less expensive to donate or destroy the item rather than ship the item to a store if no other shipments are going to that store or the truck going to that store does not have enough space to accommodate the unrequested items. Likewise, it may be less expensive to return or donate unrequested items rather than store the items if it would add to their time supplies. For example, if accepting unrequested items would create a two-week supply of the item, the excess number may add inventory holding cost that outweighs the waste factor, especially if the item is perishable (short shelf life).

The unrequested item resolution component determines if there is a store that can receive the unrequested items in a way that is cost efficient. For example, some products are so low cost, have low sales, and/or the overage resulting from accepting the items would increase costs rather than generate profit. Some products are so low cost as to be too expensive to ship to a store to sell if selling the overage amount costs more than the cost of shipping to the store outside a normal shipping schedule, etc.

In other examples, the unrequested item resolution component determines which store may be able to use the unrequested items, which store has on-hand inventory of the same item as the unrequested items which might allow that store to receive additional quantities of the item, which stores have predicted sales forecasts that indicate the unrequested items may be sold in that store, and/or whether seasonality, region, and/or product type may indicate the items would sell beyond normal replenishment or predicted forecasts. The unrequested item resolution component may also determine which store has capacity to add the unrequested items to inventory at the store.

If a store has an open order, such as a manual order or a replenishment order, conforming to the unrequested items, the open order may be wholly or partially satisfied by sending the unrequested items to the store and adjusting the open order down. This enables the distribution center to efficiently use the overage product. A replenishment order is an order based on forecasted or predicted needs. A manual order is an order for additional items beyond regular replenishment.

In some example, the requested items that are accepted (overage amount) are removed from a next open order to the same supplier that shipped the overage. The next open order is updated based on the overage. In other examples, a new open order for the overage amount/requested items from the supplier is generated.

The unrequested item resolution component determines if a supplier remedy is needed. A supplier remedy may include fining the supplier for consistent overages/repeatedly sending unrequested items, which costs the distribution center in time and resources for extra handling, creating a temporary slot in the distribution center for assembly items that are accepted (maybe good value price, anticipated need in stores) but the receiving center cannot yet send those unrequested items out to stores yet. In addition, future order(s) must be updated for that supplier. Consistent and cumulative overages from a supplier may lead to supplier fines to account for unscheduled labor spent resolving the unrequested items issues at the distribution center.

An overage usage strategy may be created and communicated to a store along with the overage amount shipped to store. The overage usage strategy may suggest the receiving store put the unrequested items on an end-cap display, an aisle display, at the front of the store, at special price, or other strategy to assist moving the items out of the store.

If an unrequested item is an item that has never been ordered (not an overage), the unrequested item resolution component may decide to accept the item to try the item out in stores. If the item sells, the item may be added to future orders. The unrequested item resolution component may identify which store to test the new item based on customer profiles of stores which may indicate whether the new item is likely to be successful. For example, an item might sell better at one store than at another based on the location of the store, season, time of year, etc. If the unrequested item is an item that used to be carried but is no longer carried/ordered, the unrequested item resolution component determines whether to accept the items based on historical data, past supplier issues, etc.

Alternatively, or in addition to the other examples described herein, examples include any combination of the following:

a verification component obtains scan data from a set of scanners, the scan data comprising item identification data for at least one item received from the supplier, and wherein the verification component analyzes the item identification data with the requested item data to verify the at least one item received from the supplier corresponds to at least one item requested from the supplier;

an unrequested items management component, implemented on the at least one processor, that updates at least one open order to the supplier of the set of unrequested items in response to receiving the accept notification from the rules-decision engine, the at least one open order is updated in real-time to reflect acceptance of the set of unrequested items;

a user-selected time, wherein the consolidated notification is generated once per-day at the user-selected time;

a verification component analyzes the unrequested item data with requested item data associated with one or more items requested from the supplier in a set of unfulfilled open orders to determine whether the set of unrequested items conforms to at least one item in at least one unfulfilled open order in the set of unfulfilled open orders and generates an accept notification on determining the set of unrequested items conforms to the at least one open order;

a communications interface component receives resolution instructions from the supplier in response to the consolidated notification, the resolution instructions comprising instructions to return the set of unrequested items or donate the set of unrequested items;

wherein the rules-decision engine accepts the set of unrequested items if an overage amount of the set of unrequested items is below an overage amount threshold associated with the set of per-item constraints;

wherein the rules-decision engine accepts the set of unrequested items if a quantity of the items in the set of unrequested items is below a quantity threshold associated with the set of per-item constraints;

wherein the predicted items data comprises data associated with a set of predicted items anticipated to be requested from the supplier within a per-item predetermined time, and wherein the prediction engine generates the set of predicted items based on contextual data, order history data, planned item orders, and predicted future demand trends;

generating an accept notification, by the rules-decision engine, on determining an overage amount of the at least one unrequested item is below an overage amount threshold in the set of per-item constraints and a quantity of the at least one unrequested item is below a quantity threshold associated with the set of per-item constraints;

updating an open order to the identified supplier to reflect acceptance of the at least one unrequested item on condition of receiving the accept notification from the rules-decision engine;

analyzing the unrequested item data associated with the at least one unrequested item using a set of predicted items anticipated to be requested from the supplier within a per-item predetermined time;

generating an accept notification on determining the at least one unrequested item conforms to at least one predicted item in the set of predicted items anticipated to be requested from the identified supplier;

wherein the at least one unrequested item is accepted in response to the accept notification;

generating a reject notification on determining the at least one unrequested item fails to conform to at least one predicted item in the set of predicted items, wherein the at least one unrequested item is rejected in response to the reject notification;

generating a new open order to the identified supplier for the at least one unrequested item or updating a pre-existing open order to the identified supplier to include the at least one unrequested item on condition of accepting the at least one unrequested item;

on occurrence of a predetermined event, retrieving, by a resolution component, a set of unresolved remedy tickets for the identified supplier from the data storage device, the plurality of unresolved remedy tickets including the generated remedy ticket for the at least one unrequested item;

extracting, by the resolution component, the supplier-specific resolution data from the retrieved set of unresolved remedy tickets;

generating the consolidated notification, by the notification component, using the extracted, supplier-specific resolution data;

receiving resolution instructions from the identified supplier in response to the consolidated notification, the resolution instructions comprising instructions to return the at least one unrequested item, donate the at least one unrequested item, or destroy the at least one unrequested item;

on receiving resolution instructions from the identified supplier in response to the consolidated notification, outputting the resolution instructions to at least one client device associated with at least one manager associated with implementing the resolution instructions regarding the at least one unrequested item;

receiving resolution instructions from the identified supplier in response to the consolidated notification, the resolution instructions comprising instructions to return the at least one unrequested item, donate the at least one unrequested item, or destroy the at least one unrequested item;

on receiving resolution instructions from the identified supplier in response to the consolidated notification, outputting the resolution instructions to at least one client device associated with at least one manager associated with implementing the resolution instructions;

on receiving verification from the at least one manager confirming the resolution instructions received from the identified supplier have been implemented, changing a status of at least one remedy ticket from unresolved to resolved, wherein the at least one remedy ticket is removed from the plurality of unresolved remedy tickets.

At least a portion of the functionality of the various elements in FIG. 1, FIG. 2, FIG. 3, FIG. 4, FIG. 5, FIG. 6 and FIG. 7 may be performed by other elements in FIG. 1, FIG. 2, FIG. 3, FIG. 4, FIG. 5, FIG. 6 and FIG. 7 or an entity (e.g., processor, web service, server, application program, computing device, etc.) not shown in FIG. 1, FIG. 2, FIG. 3, FIG. 4, FIG. 5, FIG. 6 and FIG. 7.

In some examples, the operations illustrated in FIG. 8, FIG. 9, FIG. 10, FIG. 11, FIG. 12 and FIG. 13 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform tasks or implement abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for per-supplier customized remedy resolution. For example, the elements illustrated in FIG. 1, FIG. 2, FIG. 3, FIG. 4, FIG. 5, FIG. 6 and FIG. 7 such as when encoded to perform the operations illustrated in FIG. 8, FIG. 9, FIG. 10, FIG. 11, FIG. 12 and FIG. 13, constitute exemplary means for analyzing requested item data associated with a set of open orders associated with an identified supplier using a set of per-item constraints to determine whether to accept or reject at least one unrequested item; exemplary means for generating a reject notification on determining an overage amount of the at least one unrequested item exceeds an overage amount threshold in the set of per-item constraints or a quantity of the at least one unrequested item is above a quantity threshold associated with the set of per-item constraints; exemplary means for creating a remedy ticket for the at least one unrequested item on condition of receiving a reject notification from the rules-decision engine; exemplary means for storing the remedy ticket with a plurality of unresolved remedy tickets in a data storage device; exemplary means for extracting supplier-specific resolution data from a set of unresolved remedy tickets for the identified supplier, the set of unresolved remedy tickets including the remedy ticket for the at least one unrequested item; exemplary means for generating a consolidated notification for the identified supplier, by a notification component, using the extracted, supplier-specific resolution data; and exemplary means for sending the consolidated notification to a client device associated with the identified supplier.

In another example, the elements illustrated in FIG. 1, FIG. 2, FIG. 3, FIG. 4, FIG. 5, FIG. 6, and FIG. 7 such as when encoded to perform the operations illustrated in FIG. 8, FIG. 9, FIG. 10, FIG. 11, FIG. 12 and FIG. 13 constitute exemplary means for analyzing unrequested item data associated with at least one unrequested item received from an identified supplier using a set of per-item constraints to determine whether to accept or reject the at least one unrequested item; exemplary means for generating at least one remedy ticket associated with the at least one unrequested item on receiving a reject notification from the rules-decision engine; exemplary means for extracting supplier-specific resolution data from each remedy ticket in a set of unresolved remedy tickets associated with the identified supplier retrieved from the plurality of unresolved remedy tickets on an occurrence of a predetermined event; exemplary means for generating a consolidated notification comprising the supplier-specific resolution data from the set of unresolved remedy tickets associated with the identified supplier and a request for resolution instructions regarding disposition of a plurality of unrequested items received from the identified supplier; and exemplary means for sending the consolidated notification to a client device associated with the identified supplier via a network.

In yet another example, the elements illustrated in FIG. 1, FIG. 2, FIG. 3, FIG. 4, FIG. 5, FIG. 6, and FIG. 7 such as when encoded to perform the operations illustrated in FIG. 8, FIG. 9, FIG. 10, FIG. 11, FIG. 12 and FIG. 13 constitute exemplary means for comparing unrequested item data associated with a set of unrequested items with requested items data associated with a set of open orders and a set of predicted future orders; exemplary means for generating an accept notification associated with the set of unrequested items on condition the unrequested item conforms to at least one requested item in the set of open orders or the set of predicted future orders; exemplary means for analyzing requested items data associated with a set of open orders associated with an identified supplier using a set of per-item constraints to determine whether to accept or reject at least one unrequested item on condition the set of unrequested items fails to conform to a requested item in the set of unrequested items; exemplary means for generating a reject notification on determining an overage amount of the at least one unrequested item exceeds an overage amount threshold in the set of per-item constraints or a quantity of the at least one unrequested item is above a quantity threshold associated with the set of per-item constraints; exemplary means for creating a remedy ticket for the at least one unrequested item if on condition of receiving a reject notification from the rules decision engine; exemplary means for storing the remedy ticket with a plurality of unresolved remedy tickets in a data store; exemplary means for extracting supplier-specific resolution data from a set of unresolved remedy tickets for the identified supplier, the set of unresolved remedy tickets including the remedy ticket for the at least one unrequested item; exemplary means for generating a consolidated notification for the identified supplier using the extracted, supplier-specific resolution data, the consolidated notification comprising the supplier-specific resolution data associated with each unresolved remedy ticket in the set of unresolved remedy tickets; and exemplary means for sending the consolidated notification to a client device associated with the identified supplier.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for per-supplier customized remedy resolution, the system comprising:

a memory;

at least one processor communicatively coupled to the memory;

a set of scan devices generating scan data associated with a plurality of items received at a receiving center;

a verification component, implemented on the at least one processor, analyzes the scan data using item identification data associated with a set of open orders to identify a set of unrequested items, an unrequested item comprising an item failing to conform to at least one requested item in at least one open order in the set of open orders;

the verification component, implemented on the at least one processor, compares unrequested item data associated with the set of unrequested items with requested item data associated with the set of open orders, the set of open orders comprising items requested from a selected supplier in a set of replenishment orders, a set of manual orders and a set of online orders;

the verification component, implemented on the at least one processor, generates an accept notification on determining the set of unrequested items conforms to the at least one open order in the set of open orders;

a prediction engine, implemented on the at least one processor, generates a set of predicted future orders associated with the selected supplier based on transaction history data, seasonal data and pattern analysis, the set of predicted future orders comprising predicted replenishment orders and predicted manual orders associated with a plurality of retail locations;

the prediction engine, implemented on the at least one processor, generates an accept notification on determining the set of unrequested items conforms to at least one predicted item in the set of predicted future orders;

a rules-decision engine, implemented on the at least one processor, analyzes the unrequested item data using a set of per-item constraints on condition an accept notification associated with the set of unrequested items is unreceived;

the rules-decision engine, implemented on the at least one processor, generates an accept notification on condition the set of per-item constraints indicates acceptance of the set of unrequested items and generates a reject notification on condition the set of per-item constraints indicates rejection of the set of unrequested items;

an unrequested item resolution management component, implemented on the at least one processor, generates instructions to transport the set of unrequested items to a delivery location on condition an accept notification associated with the set of unrequested items is received, wherein a drone delivery device transports the set of unrequested items to the delivery location; and a notification component, implemented on the at least one processor, that generates and outputs, via a network, a consolidated unrequested items notification for the selected supplier to a client device associated with the selected supplier on condition the reject notification is received, the consolidated notification comprising aggregated supplier-specific resolution data extracted from the set of unrequested items received from the selected supplier indicated by the reject notification generated by the rules-decision engine.

2. The system of claim 1, further comprising:
a remedy ticket generator, implemented on the at least one processor, that generates a remedy ticket associated with the set of unrequested items on receiving the reject notification from the prediction engine and the rules-decision engine, the generated remedy ticket stored with a plurality of unresolved remedy tickets corresponding to a plurality of suppliers in a data storage device; and
a resolution component, implemented on the at least one processor, that retrieves a set of unresolved remedy tickets for the supplier from the plurality of unresolved remedy tickets and extracts supplier-specific resolution data from the set of remedy tickets, the set of unresolved remedy tickets including the remedy ticket associated with the set of unrequested items.

3. The system of claim 1, further comprising:
the unrequested item management component updates at least one open order to the supplier of the set of unrequested items in response to receiving the accept notification from the rules-decision engine, the at least one open order is updated in real-time to reflect acceptance of the set of unrequested items.

4. The system of claim 1, wherein, on an occurrence of a predetermined event, the consolidated notification is generated once per-day at a user-selected time.

5. The system of claim 1, wherein the set of predicted future orders further comprises predicted future online orders.

6. The system of claim 1, further comprising:
a communication component, implemented on the at least one processor, that receives resolution instructions from the supplier in response to the consolidated notification, the resolution instructions comprising instructions to return the set of unrequested items or donate the set of unrequested items.

7. The system of claim 1, wherein the rules-decision engine accepts the set of unrequested items if an overage amount of the set of unrequested items is below an overage amount threshold associated with the set of per-item constraints.

8. The system of claim 1, wherein the rules-decision engine accepts the set of unrequested items if a quantity of the items in the set of unrequested items is below a quantity threshold associated with the set of per-item constraints.

9. The system of claim 1, further comprising:
updating at least one replenishment order associated with at least one retail location based on the set of predicted future orders.

10. A computer-implemented method for per-supplier customized remedy resolution, the computer-implemented method comprising:
comparing, by a verification component, unrequested item data associated with a set of unrequested items with requested items data associated with a set of open orders and a set of predicted future orders, the set of open orders comprising items requested from a selected supplier in a set of replenishment orders, a set of manual orders and a set of online orders, the set of predicted future orders comprising predicted replenishment orders and predicted manual orders associated with a plurality of retail locations;
generating an accept notification associated with the set of unrequested items on condition an unrequested item conforms to at least one requested item in the set of open orders or the set of predicted future orders;
analyzing, by a rules-decision engine, requested items data associated with a set of open orders associated with an identified supplier using a set of per-item constraints to determine whether to accept or reject at least one unrequested item on condition the set of unrequested items fails to conform to a requested item in the set of unrequested items;
generating a reject notification, by the rules-decision engine, on determining an overage amount of the at least one unrequested item exceeds an overage amount threshold in the set of per-item constraints or a quantity of the at least one unrequested item is above a quantity threshold associated with the set of per-item constraints;
on condition of receiving a reject notification from the rules-decision engine, creating a remedy ticket for the at least one unrequested item, by a remedy ticket generator, and storing the remedy ticket with a plurality of unresolved remedy tickets in a data store;
extracting aggregated supplier-specific resolution data from a set of unresolved remedy tickets for the identified supplier, the set of unresolved remedy tickets including the remedy ticket for the at least one unrequested item from the selected supplier;
generating a consolidated notification for the identified supplier, by a notification component, using the extracted, aggregated supplier-specific resolution data, the consolidated notification comprising the aggregated supplier-specific resolution data associated with each unresolved remedy ticket in the set of unresolved remedy tickets indicated by the reject notification generated by the rules-decision engine; and
sending, by a notification engine, the consolidated notification to a client device associated with the identified supplier on condition the reject notification is received.

11. The computer-implemented method of claim 10, further comprising:
generating an accept notification, by the rules-decision engine, on determining an overage amount of the at least one unrequested item is below an overage amount threshold in the set of per-item constraints and a quantity of the at least one unrequested item is below a quantity threshold associated with the set of per-item constraints; and
on condition of receiving the accept notification from the rules-decision engine, updating, by an unrequested items management component, an open order to the identified supplier to reflect acceptance of the at least one unrequested item.

12. The computer-implemented method of claim 10, further comprising:
analyzing, by a prediction engine, the unrequested item data associated with the at least one unrequested item using a set of predicted items anticipated to be requested from the supplier within a per-item predetermined time;
generating an accept notification, by the prediction engine, on determining the at least one unrequested item conforms to at least one predicted item in the set of predicted items anticipated to be requested from the identified supplier, wherein the at least one unrequested item is accepted in response to the accept notification; and
generating a reject notification, by the prediction engine, on determining the at least one unrequested item fails to conform to at least one predicted item in the set of predicted items, wherein the at least one unrequested item is rejected in response to the reject notification.

13. The computer-implemented method of claim 10, further comprising:
on condition of accepting the at least one unrequested item, generating a new open order to the identified supplier for the at least one unrequested item or updating a pre-existing open order to the identified supplier to include the at least one unrequested item.

14. The computer-implemented method of claim 10, further comprising:
on occurrence of a pre-determined event, retrieving, by a resolution component, a set of unresolved remedy tickets for the identified supplier from the data store, the plurality of unresolved remedy tickets including the generated remedy ticket for the at least one unrequested item;
extracting, by the resolution component, the supplier-specific resolution data from the retrieved set of unresolved remedy tickets; and
generating, by the notification component, using the extracted, supplier-specific the consolidated notification resolution data.

15. The computer-implemented method of claim 10, further comprising:
receiving resolution instructions from the identified supplier in response to the consolidated notification, the resolution instructions comprising instructions to return the at least one unrequested item, donate the at least one unrequested item, or destroy the at least one unrequested item.

16. The computer-implemented method of claim 10, further comprising:
on receiving resolution instructions from the identified supplier in response to the consolidated notification, outputting the resolution instructions to at least one client device associated with at least one manager associated with implementing the resolution instructions regarding the at least one unrequested item.

17. A system for per-supplier customized unrequested item resolution, the system comprising:
a memory;
at least one processor communicatively coupled to the memory;
a verification component that analyzes scan data to identify a set of unrequested items, compares unrequested item data associated with the set of unrequested items with requested item data associated with a set of open orders, and generates an accept notification on determining the set of unrequested items conforms to at least one open order in the set of open orders;
a prediction engine generates a set of predicted future orders associated with an identified supplier ang generates an accept notification on determining the set of unrequested items conforms to at least one predicted item in the set of predicted future orders;
a rules-decision engine, implemented on the at least one processor, analyzes the unrequested item data associated with the at least one unrequested item received from the identified supplier using a set of per-item constraints to determine whether to accept or reject the at least one unrequested item;
the rules-decision engine generates an accept notification on condition the set of per-item constraints indicates acceptance of the set of unrequested items and generates a reject notification on condition the set of per-item constraints indicates rejection of the set of unrequested items;
a remedy ticket generator, implemented on the at least one processor, generates at least one remedy ticket associated with the at least one unrequested item on receiving a reject notification from the rules-decision engine, the at least one remedy ticket stored with a plurality of unresolved remedy tickets associated with a plurality of suppliers in a data storage device;
a resolution component, implemented on the at least one processor, extracts supplier-specific resolution data from each remedy ticket in a set of unresolved remedy tickets associated with the identified supplier retrieved from the plurality of unresolved remedy tickets on an occurrence of a predetermined event;
a notification component, implemented on the at least one processor, generates a consolidated notification comprising the supplier-specific resolution data from the set of unresolved remedy tickets associated with the identified supplier and a request for resolution instructions regarding disposition of a plurality of unrequested items received from the identified supplier, the consolidated notification comprising aggregated supplier-specific resolution data extract from the set of unrequested items received from the identified supplier indicated by the reject notification generated by the rules-decision engine; and
a communication component, implemented on the at least one processor, sends the consolidated notification to a client device associated with the identified supplier via a network.

18. The system of claim 17, wherein the communication component receives resolution instructions from the identified supplier in response to the consolidated notification, the resolution instructions comprising instructions to return the at least one unrequested item, donate the at least one unrequested item, or destroy the at least one unrequested item.

19. The system of claim 17, further comprising:
at least one client device associated with at least one manager associated with implementing the resolution instructions, wherein the resolution instructions from the identified supplier in response to the consolidated notification.

20. The system of claim 18, further comprising:
an unrequested item resolution component, implemented on the at least one processor, changes a status of at least one remedy ticket from unresolved to resolved on condition a verification is received from at least one manager confirming the resolution instructions received from the identified supplier have been implemented, wherein the at least one remedy ticket is removed from the plurality of unresolved remedy tickets.

* * * * *